(12) United States Patent
Masuda

(10) Patent No.: US 9,687,732 B2
(45) Date of Patent: Jun. 27, 2017

(54) INFORMATION PROCESSING SYSTEM, INFORMATION PROCESSING APPARATUS, STORAGE MEDIUM AND INFORMATION PROCESSING METHOD

(71) Applicant: Junichi Masuda, Tokyo (JP)

(72) Inventor: Junichi Masuda, Tokyo (JP)

(73) Assignees: NINTENDO CO., LTD., Kyoto (JP); GAME FREAK INC., Tokyo (JP)

(*) Notice: Subject to any disclaimer, the term of this patent is extended or adjusted under 35 U.S.C. 154(b) by 126 days.

(21) Appl. No.: 14/143,549

(22) Filed: Dec. 30, 2013

(65) Prior Publication Data
US 2014/0187325 A1  Jul. 3, 2014

(30) Foreign Application Priority Data

Dec. 28, 2012 (JP) ................... 2012-287115
Jun. 6, 2013 (JP) ................... 2013-119709

(51) Int. Cl.
| A63F 13/00 | (2014.01) |
| A63F 13/30 | (2014.01) |
| A63F 13/40 | (2014.01) |

(52) U.S. Cl.
CPC ............ *A63F 13/12* (2013.01); *A63F 13/10* (2013.01); *A63F 2300/204* (2013.01); *A63F 2300/301* (2013.01); *A63F 2300/402* (2013.01); *A63F 2300/405* (2013.01); *A63F 2300/556* (2013.01); *A63F 2300/8029* (2013.01)

(58) Field of Classification Search
USPC .................................................... 463/31–42
See application file for complete search history.

(56) References Cited

U.S. PATENT DOCUMENTS

| 8,849,917 B2 * | 9/2014 | Dawson .............. H04L 65/4015 709/205 |
| 2005/0181877 A1 | 8/2005 | Kuwahara et al. |

(Continued)

FOREIGN PATENT DOCUMENTS

| EP | 2422855 | 2/2012 |
| JP | 2005-204753 | 8/2005 |

(Continued)

OTHER PUBLICATIONS

Mar. 3, 2014 Search Report for EP 13199649.8, 6 pages.

(Continued)

*Primary Examiner* — Masud Ahmed
(74) *Attorney, Agent, or Firm* — Nixon & Vanderhye P.C.

(57) ABSTRACT

A non-limiting example information processing apparatus that functions as a game apparatus includes a first LCD and a second LCD, and usually, a game screen of a single-play game is displayed on the first LCD and a list screen is displayed on the second LCD. In the list screen, at least an icon of a player of another game apparatus capable of performing a communication is displayed. That is, during a time that game processing of the single-play is being performed, the game screen is displayed and a list of one or more players capable of playing a battle-play is displayed. The player sends an offer of a battle-play to a desired player through an operation using the list screen at an arbitrary timing during a time that the game processing of the single-play is being performed.

21 Claims, 13 Drawing Sheets

(56) References Cited

U.S. PATENT DOCUMENTS

| | | | |
|---|---|---|---|
| 2006/0079329 A1* | 4/2006 | Yamada | A63F 13/12 463/39 |
| 2008/0207327 A1* | 8/2008 | Van Luchene | A63F 13/12 463/42 |
| 2008/0234043 A1* | 9/2008 | McCaskey | A63F 13/12 463/29 |
| 2009/0248906 A1 | 10/2009 | Yamada | |
| 2010/0113148 A1* | 5/2010 | Haltovsky | A63F 13/12 463/30 |
| 2012/0011256 A1 | 1/2012 | Masuda et al. | |
| 2012/0220230 A1 | 8/2012 | Kurata et al. | |

FOREIGN PATENT DOCUMENTS

| | | |
|---|---|---|
| JP | 2008-012072 | 1/2008 |
| JP | 2009-246767 | 10/2009 |
| JP | 2012-034325 | 2/2012 |
| JP | 2012-178747 | 9/2012 |

OTHER PUBLICATIONS

Mar. 3, 2014 Search Report for EP 13199645.6, 6 pages.
Office Action issued in corresponding Japanese Application No. 2013-119709 dated Mar. 14, 2017 and English translation (8 pages).
Play Station Now, Monthly Famitsu Connect! On, published by Enterbrain on Dec. 27, 2011, vol. 2, Second Edition (1 page)—see p. 3 of JP Office Action for description.

* cited by examiner

FIG. 3
(A) GAME SCREEN 100 (SINGLE PLAY)
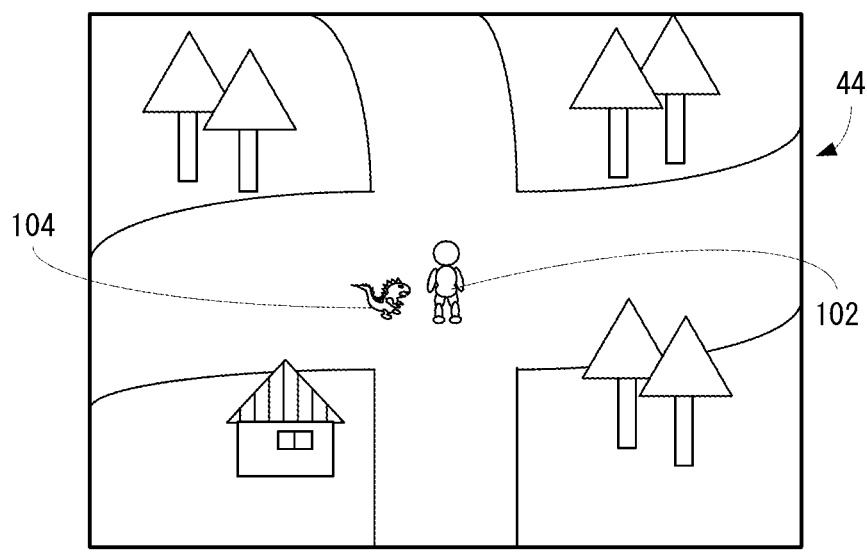
(B) LIST SCREEN 150
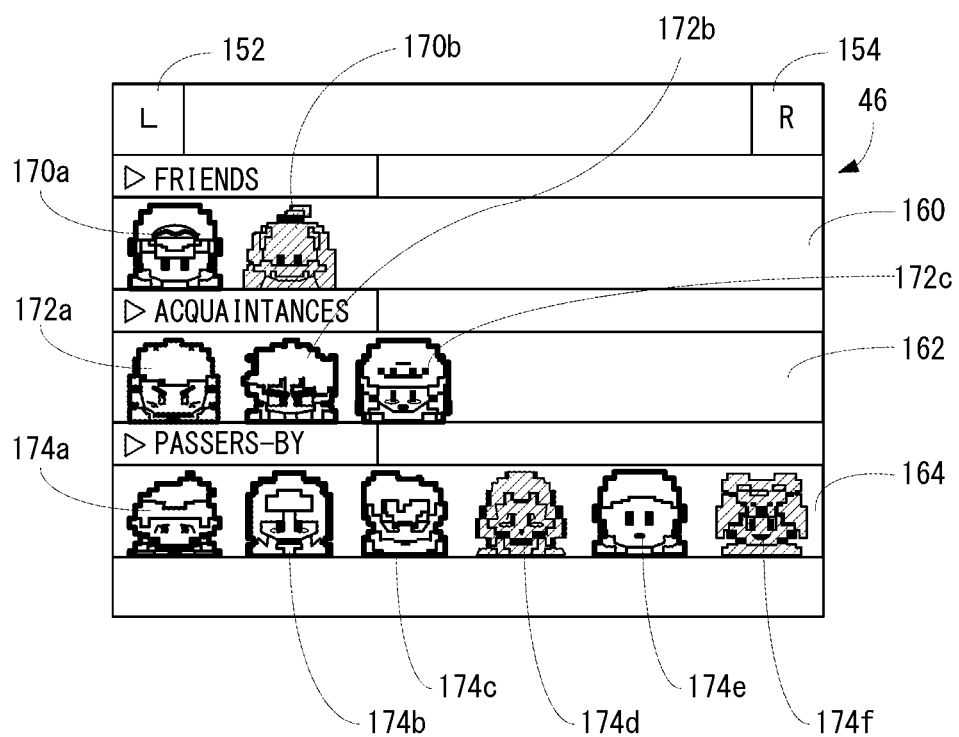

FIG. 4
(A) GAME SCREEN 100 (SINGLE PLAY)
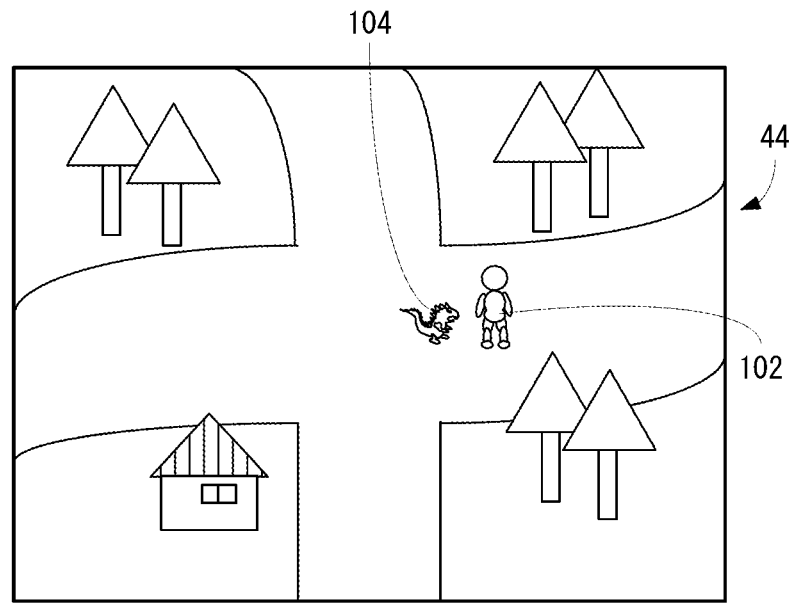
(B) OFFERING SCREEN 200
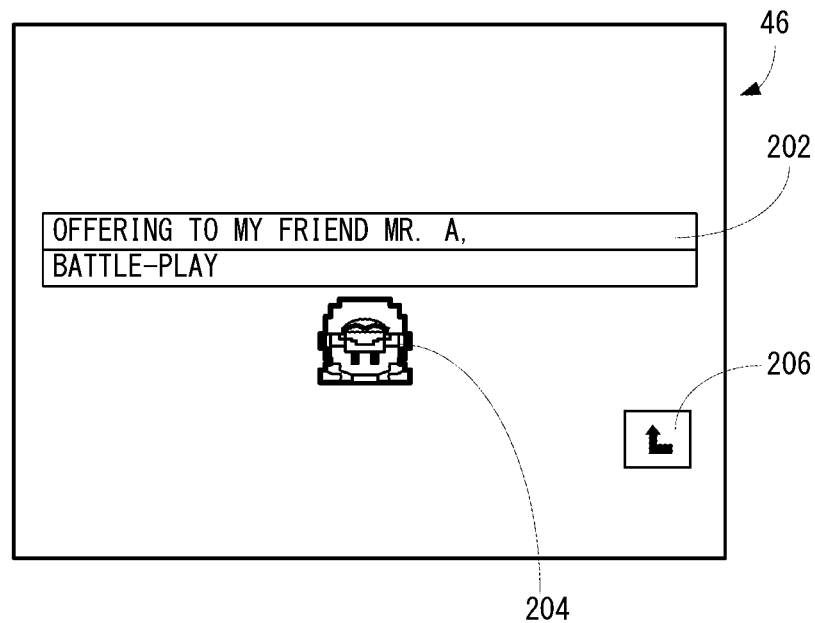

FIG. 5
(A) GAME SCREEN 100 (SINGLE PLAY)
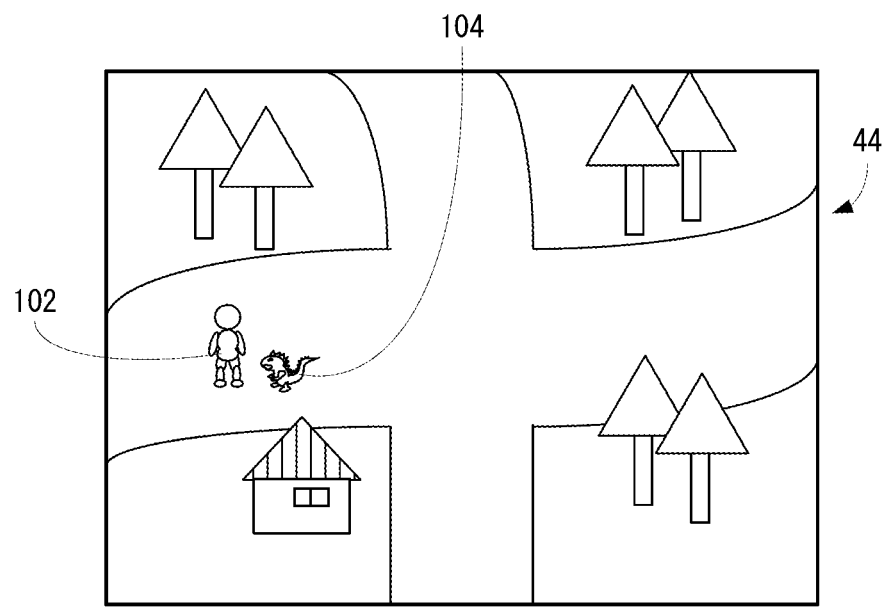
(B) OFFERED SCREEN 250
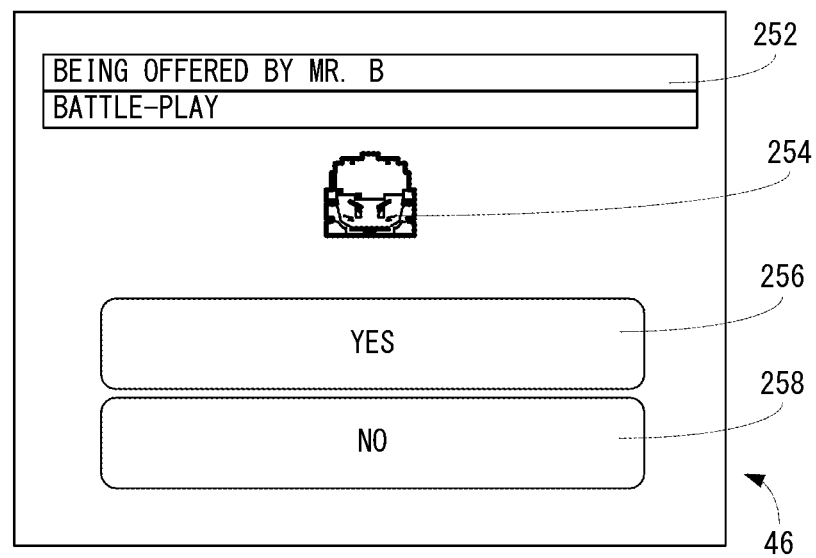

FIG. 7

PLAYER DATA

| PLAYER ID |
|---|
| NAME OF PLAYER |
| PROFILE INFORMATION |
| AVATAR INFORMATION |
| GAME SITUATION |
| ⋮ |

FIG. 8

SINGLE-PLAY PROCESSING DATA 504f

| CURRENT POSITION DATA |
|---|
| LEVEL DATA |
| POSSESSING ITEM DATA |
| POSSESSING CHARACTER DATA |
| ⋮ |

FIG. 9

BATTLE-PLAY PROCESSING DATA 504g

| RECEPTION DATA |
|---|
| BATTLE OPPONENT DATA |
| ⋮ |

INFORMATION PROCESSING SYSTEM, INFORMATION PROCESSING APPARATUS, STORAGE MEDIUM AND INFORMATION PROCESSING METHOD

CROSS REFERENCE OF RELATED APPLICATION

The disclosure of Japanese Patent Application No. 2012-287115 filed on Dec. 28, 2012 and Japanese Patent Application No. 2013-119709 filed on Jun. 6, 2013 are incorporated herein by reference.

FIELD

This application describes an information processing system, information processing apparatus, storage medium and information processing method, capable of performing a communication application with one or more information processing apparatuses.

SUMMARY

It is a primary object of an embodiment to provide a novel information processing system, information processing apparatus, storage medium and information processing method.

Another object of the embodiment is to provide an information processing system, information processing apparatus, storage medium and information processing method, capable of increasing convenience of a communication connection.

A first embodiment is an information processing system comprising an application performing unit, a first display controlling unit, a communicating unit, a searching unit, a list producing unit, a second display controlling unit and an offer sending unit. The application performing unit performs an application such as a game according to an operation by a user. The first display controlling unit displays an application performing screen of the application that is performed by the application performing unit. The communicating unit performs a communication with one or more information processing apparatuses. The communicating unit can perform a communication with the one or more information processing apparatuses directly or via a network. The searching unit repeatedly searches the one or more information processing apparatuses existing within a predetermined area by using the communicating unit. The list producing unit produces a list of the one or more information processing apparatuses that are searched by the searching unit. That is, the one or more information processing apparatuses capable of performing at least a communication are searched and a list thereof is produced. The second display controlling unit displays the list that is produced by the list producing unit. The offer sending unit sends a connection request to the one or more information processing apparatuses that are included in the list by using the communicating unit at an arbitrary timing during a time that the application is being performed. The offer sending one among the one or more unit sends, in response to an operation by the user, the connection request to a desired one among the one or more information processing apparatuses information processing apparatuses, for example.

According to the first embodiment, the application performing screen is displayed and the list of the one or more information processing apparatuses capable of performing a communication is also displayed during a time that the application is being performed, and a connection with a desired one among the one or more information processing apparatuses is requested at an arbitrary timing, and therefore, it is possible to search a desired communication partner and attempt a connection with the partner at an arbitrary timing while enjoying the application. That is, it is possible to increase convenience of a communication connection.

A second embodiment is according to the first embodiment, wherein the predetermined area is an area that the communicating unit can perform a communication with the one or more information processing apparatuses by a short-distance wireless communication.

According to the second embodiment, in a case where the desired information processing apparatus accepts the connection request, it is possible to perform a communication with each other between the information processing apparatuses in a short distance.

A third embodiment is according to the first embodiment, further comprising an offer receiving unit and a notifying unit. The offer receiving unit receives, using the communicating unit, a connection request from the offer sending unit of each of the one or more information processing apparatuses. The notifying unit notifies the user of the connection request when the offer receiving unit receives the connection request. A message notifying that there is a connection request, for example, is displayed. The application performing unit is operable to continue the performance of the application according to the user's operation even in a case where the connection request is received by the offer receiving unit.

According to the third embodiment, because the performance of the application is continued even in a case where the connection request is received, the performance of the application is not suspended or interrupted by the connection request. That is, it is possible to respond to the connection request at an arbitrary timing.

A fourth embodiment is according to the third embodiment, wherein the application performing unit is operable to continue the performance of the application even in a state that the connection request is not responded to in a case where the connection request is received by the offer receiving unit.

According to the fourth embodiment, the performance of the application is continued while the connection request is not responded to, and accordingly, an advantage similar to that of the second embodiment can be expected.

A fifth embodiment is according to the third embodiment, further comprising an accepting unit and a suspending unit. The accepting unit accepts the connection request in accordance with an operation by the user. The suspending unit suspends the application when the accepting unit accepts the connection request.

According to the fifth embodiment, since the application is suspend in a case where the connection request is accepted according to the user's operation, the connection request can be accepted at a timing that the application may be suspended.

A sixth embodiment is according to the third embodiment, further comprising a refusing unit. The refusing unit refuses the connection request when a predetermined time period elapses in a state that the connection request is not responded to after the notifying unit notifies the user of the connection request.

According to the sixth embodiment, it is possible to automatically refuse a connection request even if the user does not respond to the connection request. That is, it is possible to save the user's trouble.

A seventh embodiment is according to the fifth embodiment, further comprising a communication application performing unit. The communication application performing unit performs a communication application that is different from the above-described application with the one or more information processing apparatuses when the connection request is accepted by the accepting unit. The communication application is a game of a battle-play, for example.

According to the seventh embodiment, by accepting the connection request, it is possible to perform a communication application with a user who requests the connection.

An eighth embodiment is according to the seventh embodiment, wherein the application performing unit is operable to re-start the performance of the application that is suspended by the suspending unit when the performance of the communication application is terminated.

According to the eighth embodiment, since the performance of the application that is suspended is re-started, when data that is produced through the performance of the application is stored at a time that the application is suspended, for example, it is possible to re-start the performance of the application from a time point that the application is suspended.

A ninth embodiment is according to the first embodiment, wherein the list includes information of the information processing apparatus that becomes incapable of performing a communication. The second display controlling unit is operable to display the information of an information processing apparatus capable of performing a communication and the information of an information processing apparatus incapable of performing a communication in different manners. In addition, the information of the information processing apparatus incapable of performing a communication may be non-displayed.

According to the ninth embodiment, since the information of the information processing apparatus capable of performing a communication and the information of the information processing apparatus incapable of performing a communication are displayed in different manners, it is possible to easily select only the information processing apparatus capable of performing a communication.

A tenth embodiment is according to the first embodiment, wherein the list further includes information of an information processing apparatus of a first category, that is allowed to perform a communication with each other or in a one-way manner. That is, the information of an information processing apparatus other than the information processing apparatus that is searched is also included in the list. Accordingly, the second display controlling unit is operable to display, in a discriminable manner, the information of the information processing apparatus of the first category, and the information of the information processing apparatus of a second category not belonging to the first category out of the one or more information processing apparatuses that are searched by the searching unit.

According to the tenth embodiment, it is possible to easily discriminate the first category or the second category and send a connection request to a desired one among the one or more information processing apparatuses.

An eleventh embodiment is according to the tenth embodiment, wherein the second display controlling unit is operable to display the information of the information processing apparatus of the first category and the information of the information processing apparatus of the second category in a further discriminable manner on whether the information processing apparatus can perform a communication.

According to the eleventh embodiment, it is possible to easily know not only whether the information processing apparatus is of the first category or the second category but also whether the information processing apparatus can perform a communication.

A twelfth embodiment is according to the tenth embodiment, wherein the second display controlling unit is operable to display at least one of the information of the information processing apparatus of the first category and the information of the information processing apparatus of the second category in accordance with a first displaying condition that is set in advance.

According to the twelfth embodiment, it is possible to display the information of the information processing apparatus for each category by narrowing the information of the one or more information processing apparatuses at a side that performs a search.

A thirteenth embodiment is according to the first embodiment, wherein the communicating unit is operable to broadcast a predetermined signal including at least information of the own information processing system.

According to the thirteenth embodiment, since the predetermined signal is broadcasted, it is possible to easily notify the own information to the one or more information processing apparatuses that exist within the predetermined area.

A fourteenth embodiment is according to the thirteenth embodiment, wherein the predetermined signal includes a second displaying condition that indicates it is possible for the information processing apparatus that receives the information of the own information processing system to display the information of the own information processing system.

According to the fourteenth embodiment, it is possible to narrow the information processing apparatus capable of displaying the information of the own information processing system at a side that is searched.

A fifteenth embodiment is according to the fourteenth embodiment, wherein the one or more information processing apparatuses include an information processing apparatus of the first category that is allowed to perform a communication with each other or in a one-way manner and an information processing apparatus of the second category not belonging to the first category out of the one or more information processing apparatuses searched by the searching unit. The second displaying condition is a condition that designates at least one of the information processing apparatus of the first category and the information processing apparatus of the second category.

According to the fifteenth embodiment, it is possible to narrow and display the information processing apparatus capable of displaying the information of the own information processing system at a side that is searched.

A sixteenth embodiment is according to the thirteenth embodiment, wherein the predetermined signal further includes identification information of the application. The list producing unit is operable to produce the list by using a predetermined signal including the identification information of the application that is being performed by the application performing unit out of the predetermined signal from the information processing apparatus that is received by the communicating unit.

According to the sixteenth embodiment, it is possible to produce a list associated with the information processing apparatus that performs the same application.

A seventeenth embodiment is according to the thirteenth embodiment, wherein the predetermined signal is a beacon signal.

According the seventeenth embodiment, it is possible to notify to the information processing apparatus the information of the own information processing system.

An eighteenth embodiment is according to the first embodiment, wherein the searching unit is operable to search the one or more information processing apparatuses during a time that the application is being performed by the application performing unit.

According to the eighteenth embodiment, the own information processing system and the one or more information processing apparatuses can search with each other during a time that the application is being performed.

A nineteenth embodiment is an information processing apparatus comprising an application performing unit, a first display controlling unit, a communicating unit, a searching unit, a list producing unit, a second display controlling unit and an offer sending unit. The application performing unit performs an application such as a game according to an operation by a user. The first display controlling unit displays an application performing screen of the application that is performed by the application performing unit. The communicating unit performs a communication with another information processing apparatus. The communicating unit can perform a communication with another information processing apparatus directly or via a network. The searching unit repeatedly searches one or more other information processing apparatuses in a short distance by using the communicating unit. The list producing unit produces a list of the one or more other information processing apparatuses that are searched by the searching unit. That is, the one or more other information processing apparatus capable of performing at least a communication are searched and a list thereof is produced. The second display controlling unit repeatedly displays the list that is produced by the list producing unit. The offer sending unit sends a connection request to the one or more other information processing apparatuses that are included in the list by using the communicating unit at an arbitrary timing during a time that the application is being performed. The offer sending unit sends, in response to an operation by the user, the connection request to the one or more other information processing apparatuses, for example.

A twenty embodiment is a non-transitory computer readable storage medium storing an information processing program that causes a computer of an information processing apparatus to function as: an application performing unit operable to perform an application according to an operation by a user; a first display controlling unit operable to display an application performing screen of the application that is performed by the application performing unit; a communicating unit operable to perform a communication with another information processing apparatus; a searching unit operable to repeatedly search one or more other information processing apparatuses that exist within a predetermined area by using the communicating unit; a list producing unit operable to produce a list of the one or more other information processing apparatuses that are searched by the searching unit; a second display controlling unit operable to repeatedly display the list that is produced by the list producing unit on a display device or a further display device different form the display device; and an offer sending unit operable to send a connection request to the one or more other information processing apparatuses that are included in the list by using the communicating unit at an arbitrary timing during a time that the application is being performed.

A twenty-first embodiment is an information processing method in an information processing apparatus comprising a communicating unit operable to perform a communication with another information processing apparatus, wherein a computer of the information processing apparatus: (a) performs an application in response to an operation by a user; (b) displays an application performing screen of the application that is performed in the step (a); (c) searches one or more other information processing apparatuses in a short distance by using the communicating unit repeatedly; (d) produces a list of the one or more other information processing apparatuses that are searched in the step (c); (e) displays the list that is produced in the step (d) repeatedly; and (f) sends a connection request to the one or more other information processing apparatuses that are included in the list by using the communicating unit at an arbitrary timing during a time that the application is being performed.

In the nineteenth to twenty-first embodiments as well, as similar to the first embodiment, it is possible to increase convenience of a communication connection.

The above described objects and other objects, features, aspects and advantages of the embodiments will become more apparent from the following detailed description when taken in conjunction with the accompanying drawings.

BRIEF DESCRIPTION OF THE DRAWINGS

FIG. 3 is a view showing first non-limiting example screens displayed on a first LCD and a second LCD shown in FIG. 2.

FIG. 4 is a view showing second non-limiting example screens displayed on the first LCD and the second LCD shown in FIG. 2.

FIG. 5 is a view showing third non-limiting example screens displayed on the first LCD and the second LCD shown in FIG. 2.

FIG. 7 is a view showing a non-limiting example specific content of player data.

FIG. 8 is a view showing a non-limiting example specific content of single-play processing data.

FIG. 9 is a view showing a non-limiting example specific content of battle-play processing data.

DETAILED DESCRIPTION OF NON-LIMITING EXAMPLE EMBODIMENTS

Figure 1:
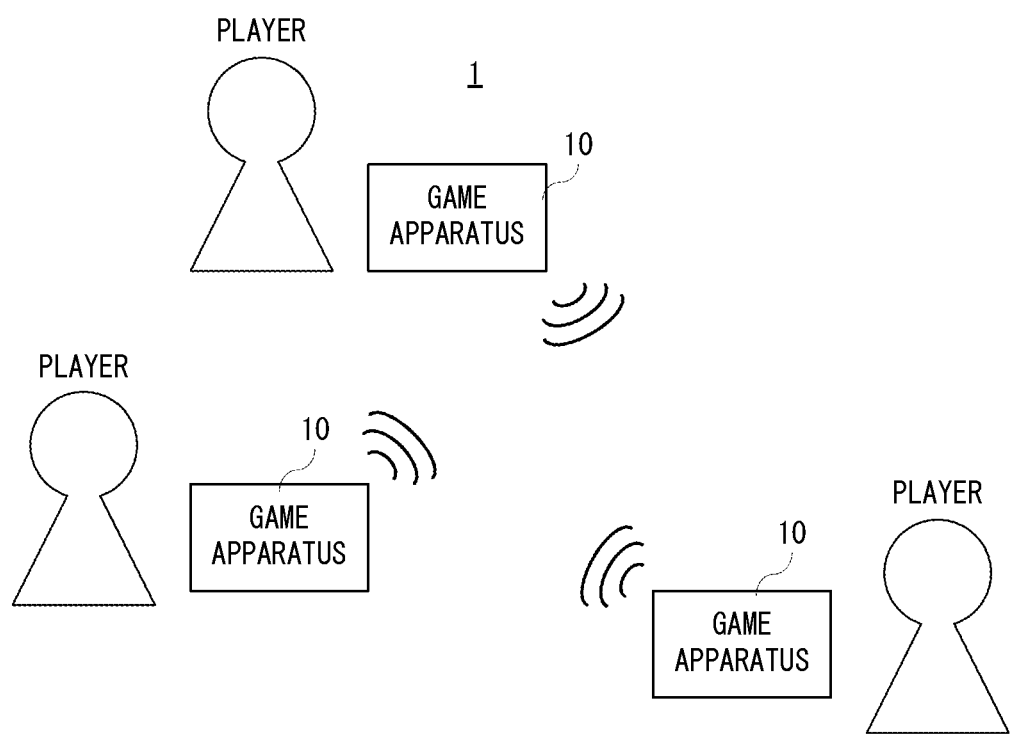
FIG. 1 is a view of a non-limiting example communication game system according to an embodiment.

With referring to FIG. 1, a communication game system 1 according to this embodiment includes a game apparatus 10 that is an example of an information processing apparatus. As seen from FIG. 1, the communication game system 1 is constructed by a plurality of game apparatuses 10, and each of the plurality of game apparatuses 10 is held by each different user or player (hereinafter, simply called as "player"). That is, the game apparatus 10 is a mobile (portable) game apparatus. Although three game apparatuses 10 are shown in the communication game system 1 shown in FIG. 1, if two or more, the number of the game apparatuses may be four or more.

Figure 2:
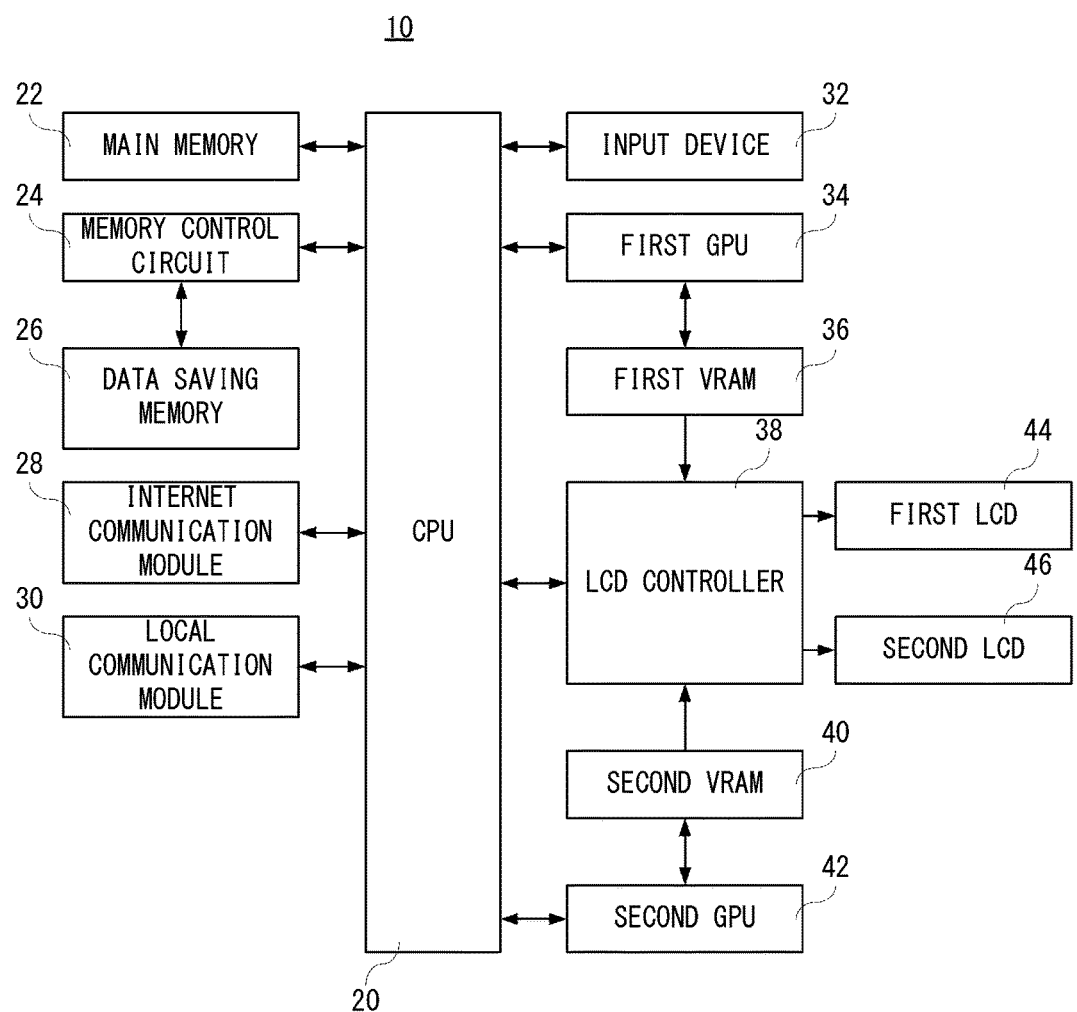
FIG. 2 is a block diagram showing a non-limiting example electric configuration of a game apparatus shown in FIG. 1.

FIG. 2 is a block diagram showing an example of electrical structure of the game apparatus 10 shown in FIG. 1. As shown in FIG. 2, the game apparatus 10 includes a CPU 20 which is connected with a main memory 22, a memory control circuit 24, an internet communication module 28, a local communication module 30, an input device 32, a first GPU (Graphics Processing Unit) 34, an LCD controller 38 and a second GPU 42. In addition, the memory control circuit 24 is connected with a data saving memory 26. Furthermore, a first VRAM (Video RAM) 36 is connected between the first GPU 34 and the LCD controller 38, and a second VRAM 40 is connected between the second GPU 42 and the LCD controller 38. Furthermore, a first LCD 44 and a second LCD 46 are connected to the LCD controller 38.

The CPU 20 is a processor or an information processing means for executing a predetermined program (application program). In this embodiment, the predetermined program is stored in a memory, (the data saving memory 26, for example) within the game apparatus 10 or an external memory, and the CPU 20 performs information processing (game processing) described later by executing the predetermined program.

In addition, the program to be executed by the CPU 20 may be stored in a memory in advance, or may be acquired from a memory card that is attachable to the game apparatus 10, or may be acquired (downloaded) from other equipment by performing communication with the other equipment. Furthermore, an information storage medium that stores the predetermined program may be not only a non-volatile storage medium such as the data saving memory 26 but also an optical disc storage medium such as a CD-ROM, DVD or the like.

The main memory 22 is a storage or storing means that is utilized as a working area and a buffer area of the CPU 20. That is, the main memory 22 stores (temporarily stores) various kinds of data utilized for the above-described information processing, or stores programs acquired from an external (memory card or other equipment). In this embodiment, as the main memory 22, a PSRAM (Pseudo-SRAM), for example, is utilized.

The data saving memory 26 is a storage or storing means for storing (saving) data or the like such as programs to be executed by the CPU 20 and game data. The data saving memory 26 is constructed by a non-volatile storage medium, and a NAND-type flash memory may be utilized. The memory control circuit 24 controls reading data from or writing data to the data saving memory 26 in accordance with instructions by the CPU 20.

The internet communication module 28 has a function that connects to a wireless LAN according to a system conforming to a standard of IEEE 802.11.b/g, for example. Therefore, the CPU 20 sends/receives data to or from other equipment (a computer, other game apparatuses, etc.) via an access point and an internet by using the internet communication module 28, for example.

The local communication module 30 has a function that performs a short-distance wireless communication. More specifically, the local communication module 30 has a function that performs sending/receiving of an infrared ray signal with other equipment (other game apparatuses or the like) by a predetermined communication system (an infrared ray system, for example), and a function that performs a wireless communication with the same kind of game apparatuses in accordance with a predetermined communication protocol (a multilink protocol, for example). Therefore, the CPU 20 can directly sends/receives data to or from other same kinds of game apparatuses by using the local communication module 30, for example.

The input device 32 includes various operating portions such as a push button, a cross button, an analog stick, a touch panel and so on. Operation data that indicates an inputting situation (whether or not depressed) against each button and touch position data of a predetermined format based on a signal from the touch panel are output from the input device 32. The CPU 20 acquires the operation data and the touch position data from the input device 32, and performs processing according to acquired operation data and touch position data. Although a detailed description is omitted here, in this embodiment, the touch panel is provided on the second LCD 46.

The first GPU 34 produces, according to instructions from the CPU 20, a first displaying image based on data that is stored in the main memory 22 for producing a displaying image, and renders the same in the first VRAM 36. The second GPU 42 similarly produces a second displaying image according to instructions from the CPU 20 and renders the same in the second VRAM 40.

The LCD controller 38 outputs the first displaying image that is rendered in the first VRAM 36 to the first LCD 44, and the second displaying image that is rendered in the second VRAM 40 to the second LCD 46.

In addition, in this embodiment, the LCD is utilized as a display device, but instead of the LCD, an EL (Electronic Luminescence) display or a plasma display may be utilized. Furthermore, the game apparatus 10 can utilize a display device having any resolution. Furthermore, the LCD controller 38 may output the first displaying image to the second LCD 46 and the second displaying image to the first LCD 44.

Furthermore, although not shown, there is also provided with a speaker for outputting a sound (music) necessary for a game.

In such a game apparatus 10, when a player starts a game, for example, usually, game processing of a single-play is started (performed). In addition, a single-play mode means a mode that a personal game is played by a player of the game apparatus 10 alone by operating a single player character existing in a virtual game world.

Furthermore, in the game processing of the single-play mode, a player who plays the same game is searched as a candidate of a battle opponent. When it is determined that a battle-play is to be performed by making an offering of a battle-play to the candidate of the battle opponent that is searched or by being receiving an offer of the battle-play from the candidate of the battle opponent, a connection is established between a plurality of game apparatuses 10 that it is determined that the battle-play is to be performed, and then, the game processing of a battle-play mode is performed. In addition, the battle-play mode means a mode that a game for a plurality of persons is processed by operating respective player characters existing in a virtual game world by players of the plurality of game apparatuses 10.

In this embodiment, by performing the game processing of the single-play mode, a game screen (application performing screen) 100 as shown in FIG. 3(A) is displayed on the first LCD 44. In the game screen 100, an image of a game world is displayed as a background, and on the image of the game world, a player character 102 and a monster character 104 that is possessed by the player character 102 are displayed.

In the single-play mode, the player character 102 moves in the game world constructed in a virtual space, or catches a wild monster character existing in the game world, or makes the monster character 104 that is caught (possessed) fight with a monster character that a non-player character (not shown) possesses or a wild monster character, in accordance with an operation of the player. The player character 102 gets a predetermined item (not shown) and uses the same according to an operation by the player.

Furthermore, in the single-play mode, as shown in FIG. 3(B), a list screen 150 for performing a selection of a battle opponent in a case where the game processing of the battle-play mode is to be performed is displayed on the second LCD 46. In addition, the list screen 150 is not needed to be always displayed during a time that the game processing of the single-play mode is being performed, and the player may select displaying/non-displaying. Furthermore, in a state that it is impossible to perform the battle-play with a player of another game apparatus 10, the list screen 150 is not displayed. The state that the battle-play cannot be performed means a state that a communication cannot be performed, a state that it is impossible to send an offer of the battle-play in view of circumstances in the game processing of the single-play mode, or the like, for example. That is, the list screen 150 is displayed when it is possible to send an offer of the battle-play to a player of another game apparatus 10.

In the list screen 150 shown in FIG. 3(B), a button image 152 is displayed in an upper left portion, and a button image 154 is displayed in an upper right portion. Below the button image 152 and the button image 154, displaying regions 160, 162 and 164 are formed. In the displaying region 160, icons 170*a* and 170*b* applied with face images of game avatars that are used by players who are registered as friends are displayed. Furthermore, in the displaying region 162, icons 172*a*, 172*b* and 172*c* applied with face images of game avatars that are used by players who are determined as acquaintances are displayed. In the displaying region 164, icons 174*a*, 174*b*, 174*c*, 174*d*, 174*e* and 174*f* each applied with a face image of a game avatar that is used by a players who is determined as a passer-by are displayed.

Here, a friend player means another player who is allowed (registered) to communicate with each other or in a one-way manner even in a period other than a time that the game is played. Information (player data) for the player who is registered as a friend player is stored in the data saving memory 26 of the game apparatus 10, for example.

Furthermore, an acquaintance player means another player who is not registered as a friend player but has performed at least one time the battle-play in the past. Player data for the player who is determined as an acquaintance player is stored in the data saving memory 26 of the game apparatus 10 as save data together with game data of the battle-play, for example. Although not shown, the save data may be stored in a memory card (SD card, for example) attachable to/detachable from the game apparatus 10.

In addition, although a detailed description is omitted here, each player can exchange (sending/receiving) a monster character 104 possessed by the player character 102 in the game world between the game apparatus 10 and another game apparatus 10 by performing a communication with the other game apparatus 10 by using the game apparatus 10. Another player is also determined as an acquaintance player if the other player has made an exchange of the monster character 104 in the past at least one time.

Furthermore, a passer-by player is a player who is not registered as a friend player and is not determined as an acquaintance player, and a player who owns another game apparatus 10 that is determined that the other game apparatus 10 becomes in a state capable of communicating with the game apparatus 10 at least temporarily in the single-play mode. More specifically, the passer-by player means a player having another game apparatus 10 that sends an information notifying bacon signal (described later) that is received by the game apparatus 10 in the single-play mode. The player data for the player who is determined as the passer-by player is erased at a time that the game is terminated, for example.

The friend players, the acquaintance players and the passer-by players can be respectively displayed by a predetermined number (100 (a hundred), for example). In a case where the number of the players exceeds the predetermined number, the information (player data) of the player who is registered as a friend player at the earliest time or determined as an acquaintance or a passer-by at the earliest time, that is, the oldest player will firstly be overwritten. Although not shown, the displaying regions 160, 162 and 164 displays portions of columns that the icons (170*a*, 170*b*, 172*a*-172*c*, 174*a*-174*f*, etc.) applied with face images of the game avatars used by the friend player, the acquaintance player and the passer-by player are displayed (depicted).

The above-described button images 152 and 154 indicate operating buttons for scrolling the list screen 150. By depressing an L button or an R button included in the input device 32, the list screen 150 is scrolled toward left or right. In addition, by performing a slide operation on the touch panel, the list screen 150 can be also scrolled. By scrolling the list screen 150, it is possible to display an icon that is not currently displayed.

In addition, the player can set (select) a candidate of the battle opponent, that is, a target (player) with whom the battle-play is to be performed. Information of the target that is set for performing the battle-play, that is, battle-play setting information, is stored in the game apparatus 10. That is, the list screen 150 shown in FIG. 3(B) is an example of a case where a friend player, an acquaintance player and a passer-by player are set as the target with whom the battle-play is to be performed. Therefore, in a case where the player is not selected as a target of the battle-play, the corresponding displaying regions 160, 162 and 164 are eliminated (non-displayed) from the list screen 150. In another embodiment, icons corresponding to players who are not selected as a target of the battle-play may be displayed in a gray out manner while the displaying regions 160, 162 and 164 are being displayed.

More specifically, a target of the battle-play is discriminated or narrowed in accordance with a predetermined condition such as the battle-play setting information that is stored (set) in the game apparatus 10, and an icon of the target of the battle-play that is thus discriminated or narrowed is displayed in the list screen 150.

In addition, in this embodiment, as the predetermined condition (a target of the battle-play), a friend player, an acquaintance player or a passer-by player is individually selected; however, not limited to this, other conditions (game level, distinction of sex, residential region, etc.) may be selected. In addition, a friend player and an acquaintance player may be individually selected whether the player is to be a target of the battle-play.

In this embodiment, the list screen 150 is renewed (produced) by receiving an information notifying beacon signal that is sent from one or more other game apparatuses 10. As a content to be renewed, an icon of a passer-by player is added in a column for the passer-by player, or a displaying manner of an icon (in FIG. 3(B), 170*a*, 170*b*, 172*a*-172*c*, 174*a*-174*f*) that is displayed in each displaying region 160, 162 or 164 is changed.

Each game apparatus 10 repeatedly sends (broadcasts) a situation notifying beacon signal to unspecified one or more other game apparatuses 10 by using the local communication module 30 during a time that a game of the single-play mode is being performed. Each game apparatus 10 repeatedly receives a situation notifying beacon signal that is sent from unspecified one or more other game apparatuses 10 by using the local communication module 30 during a time that a game of the single-play mode is being performed.

Although a detailed description is omitted here, the situation notifying beacon signal is sent/received by using the local communication module 30 even in the battle-play mode.

A system for sending the beacon signal may be an active scan system or may be a passive scan system. More specifically, each game apparatus 10 may send (broadcast) a beacon signal with a predetermined cycle without specifying a designation, or each game apparatus 10 may send a probe request packet at a predetermined cycle without specifying a designation, and a beacon signal (probe response) may be sent from one or more other game apparatuses 10 that receive a probe request packet. In addition, a beacon signal that is sent/received in this embodiment is a short-distance wireless signal. The short-distance wireless signal is an infrared ray signal or a radio wave signal by Bluetooth (registered trademark), for example.

Here, a situation notifying beacon signal (a first beacon signal) includes a beacon ID, a device ID, a game ID, player information, a game situation, battle-play setting information, etc.

The beacon ID is identification information for identifying a kind of the beacon signal. In this embodiment, there are three kinds of beacon signals described later in addition to an information notifying beacon signal. Such a kind is identified according to the beacon ID. The device ID is identification information for identifying the game apparatus 10. The game ID is identification information for identifying a kind of a game.

The player information includes a player ID, a name of player, profile information of the player, avatar information, etc. The player ID is identification information of an owner (player) of the game apparatus 10, and indicates a transmission source of the beacon signal including the player ID. The name of player is a name that is registered in the game apparatus 10 by the player. The profile information is information of a profile (distinction of sex, place of residence, hobby, etc.) of a player him/herself that is registered by the player in the game apparatus 10. The avatar information is setting information (parameter) as to parts of a face (including hair), parts of a body, costume (a cap or hat, glasses, accessories, etc. are included) of a game avatar that is used by the player.

The game situation is information indicating whether the game processing that is being performed is a single-play mode or a battle-play mode.

The battle-play setting information is information for setting a target of the battle-play. As described above, a friend player, an acquaintance player and a passer-by player can be set as a target of the battle-play, and can be individually removed from the target of the battle-play. That is, it is possible to limit or restrict (discriminate or narrow) a target of the battle-play. By thus including the battle-play setting information in the first beacon signal, the list screen 150 can be displayed by adding the battle-play setting information included in a received first beacon signal to the battle-play setting information that is set in the game apparatus 10.

Here, a method for renewing (producing) the list screen 150 is described. When the first beacon signal from one or more other game apparatuses 10 is received, for example, the game apparatus 10 determines whether the game ID included in the first beacon signal is coincident with the game ID of the game in the embodiment. In a case of inconsistency of the game ID, the first beacon signal that is received is erased (removed).

In a case of consistency of the game ID, it is determined whether a player indicated by the player ID is a player who is registered as a friend, or who is determined as an acquaintance. In a case where the player indicated by the player ID is registered as a friend or determined as an acquaintance, a displaying manner of an icon is changed in accordance with the game situation. In a case where the game situation indicates a single-play mode, the icon is displayed with a normal color and brightness, and in a case where the game situation is a battle-play mode, the icon is displayed in a gray out manner because the battle-play is being performed at the present and thus another battle-play cannot be played. In FIG. 3(B), by applying slant lines onto the face image, it is indicated that the icon is displayed in a gray out manner; however, a displaying manner may be only a manner different from a normal displaying manner, and accordingly, a color, shape or size of the icon or two or more thereof may be changed. Furthermore, the icon may be non-displayed.

In a case where the first beacon signal from the game apparatus 10 that is owned by a friend player or an acquaintance player cannot be received for a predetermined time period (180 seconds, for example), it is impossible to perform a battle-play because the game apparatus 10 is in an off-line state or does not exist in an area that the beacon signal reaches (at a closer distance). Accordingly, in such a case, the icon is displayed in a gray out manner.

After that, when the game apparatus 10 performs the game processing of the single-play mode, or is made in an on-line state, or becomes within the area that the beacon signal reaches (in a short distance) a corresponding icon becomes to be displayed with a normal color and brightness. That is, it is possible to know in a real time the game situation and a communication situation (these may be collectively called as "current situation") by a change of the displaying manner of the icon.

Furthermore, in this embodiment, as for a player who owns another game apparatus 10 that becomes a communication-incapable state, by saving the information that is lastly received (information of the first beacon signal), even in a case where the corresponding icon is being displayed in a gray out manner, it is possible to see the information of the player (profile, etc.). In a case where the other game apparatus 10 becomes in a communication-capable state, the information that is saved is renewed with the newest information.

In a case where the game IDs are coincident with each other and a player who is indicated by the player ID is not a friend player or an acquaintance player, it is determined whether the player has been determined as a passer-by player, that is, whether the player has been added in the displaying column.

In a case where the player has been added as a passer-by player, a displaying manner of an icon is changed according to the game situation. A change of the displaying manner is the same in a case of the icon of a friend player or an acquaintance player; however, in a case where a first beacon signal from the game apparatus 10 that is owned by the player who has been added as a passer-by player cannot be received for a predetermined time period (180 seconds, for example), the icon is displayed in a gray out manner because the game apparatus 10 is in an off-line state or does not exist within a range that the beacon signal reaches.

In addition, in this embodiment, the icon of the player having the game apparatus 10 that is in an off-line state or does not exist within a range that the beacon signal reaches is displayed in a gray out manner; however, such the icon may be non-displayed.

Excepting a player whose current game situation is the battle-play or a player who is in an off-line state, in a case where an icon of a player (a friend player, an acquaintance player, and a passer-by player) who owns the game apparatus 10 that does not exist within a range that the beacon signal reaches is non-displayed, only an icon of a player who exists in the range that the beacon signal reaches (predetermined area) and able to perform a battle-play is displayed.

As described above, the battle-play setting information (here, called as "own apparatus battle-play setting information") is stored in the game apparatus 10, and in the first beacon signal that is received, the battle-play setting information that is registered in the game apparatus 10 being a transmission source of the first beacon signal (here, called as "other apparatus battle-play setting information") is described. Such the other apparatus battle-play setting information is also information for limiting or restricting (discriminating or narrowing) a target of the battle opponent as described above.

Therefore, in this embodiment, the displaying/non-displaying of the displaying regions 160, 162 and 164 are controlled based on the own apparatus battle-play setting information, and the displaying, etc. of the icon for the player of a friend player, an acquaintance player or an passer-by player is controlled based on the other apparatus battle-play setting information.

In a case where only a friend player is set as a target of the battle-play in the other apparatus battle-play setting information, in the game apparatus 10 that receives the first beacon signal including the other apparatus battle-play setting information, only in a case where the player of the transmission source of the first beacon signal (the player shown by the player ID) is registered as a friend player, the displaying manner of the icon of the player is changed according to the game situation. In addition, in a case where the displaying region 160 is non-displayed based on the own apparatus battle-play setting information, the list screen 150 is not renewed according to the first beacon signal.

In a case where only a passer-by player is set as a target of the battle-play in the other apparatus battle-play setting information, for example, in the game apparatus 10 that receives the first beacon signal including the other apparatus battle-play setting information, only in a case where the player of the transmission source of the first beacon signal (the player shown by the player ID) is not registered as a friend player or not determined an acquaintance player, an icon of the player can be added into a column for a passer-by player, and a displaying manner of the icon of the player can be changed according to the game situation. In addition, in a case where the displaying region 164 is non-displayed based on the own apparatus battle-play setting information, the list screen 150 is not renewed according to the first beacon signal.

Although a detailed description is omitted here, as for other cases, as similar to the above, the displaying/non-displaying of the displaying regions 160, 162 and 164 is controlled based on the own apparatus battle-play setting information, and the displaying, etc. of the icon for a friend player, an acquaintance player, or a passer-by player is controlled based on the other apparatus battle-play setting information.

Thus, in the single-play mode, respective game apparatuses 10 send the first beacon signal to one or more other game apparatuses 10, and receive a first beacon signal from one or more other game apparatuses 10 to mutually search a candidate of the battle opponent. In addition, as a candidate of the battle opponent, one or more other game apparatuses 10 that exist within a predetermined area that the first beacon signal can be sent and received, that is, one or more other players who exist in a relatively short-distance are searched.

Although it is determined whether the player is registered as a friend or determined as an acquaintance with referring to the player information (player data) included in the first beacon signal in this embodiment, not limited to this. It may be determined whether the player is registered as a friend or determined as an acquaintance based on the identification information (device ID) of the one or more other game apparatuses 10.

In a case where the game processing of the single-play mode is performed, by selecting (touching) a desired icon (in FIG. 3(B), 170*a*, 170*b*, 172*a*-172*c*, and 174*a*-174*f*) in the list screen 150, it is possible to see the profile information of the corresponding player or send an offer of the battle-play to the corresponding player.

When the icon 170*a* is selected in the list screen 150 shown in FIG. 3(B), for example, and an offer of the battle-play is sent (the battle-play is requested) to the corresponding player, a screen (an offering screen) 200 that is shown in FIG. 4(B) and for making an offer of the battle-play is displayed on the second LCD 46. At this time, as shown in FIG. 4(A), the game screen 100 of the single-play is still displayed in the first LCD 44, and therefore, the single-play is continued according to an operation by the player. As seen through a comparison of FIG. 3(A) and FIG. 4(A) with each other, even if the offer of the battle-play is being sent, according to an operation by the player, the player character 102 and the monster character 104 are moved in the game world.

As shown in FIG. 4(B), the offering screen 200 includes a displaying region 202 at the center of the screen and an icon 204 below the displaying region 202. A button image 206 is displayed in a lower right portion of the offering screen 200. In the displaying region 202, information (text information) indicating to whom (what player) the offer of the battle-play is sent is displayed. The icon 204 is an icon that is applied with a face image of a game avatar that is used by an opponent player to whom the offer of the battle-play is sent. As seen from FIG. 3(B), the opponent player to whom the offer of the battle-play is sent is a friend player (a player corresponding to an icon 170*a*). Furthermore, by selecting (touching) the icon 204, it is possible to see the profile information of the corresponding player. The button image 206 is a button for returning to the list screen 150. When the button image 206 is turned-on (touched), the list screen 150 as shown in FIG. 3(B) is displayed on the second LCD 46. At this time, the offer of the battle-play may be canceled.

As described above, the offer of the battle-play to a player of one or more other game apparatuses 10 can be sent by utilizing the list screen 150 at an arbitrary timing during a time that the game of the single-play is being performed; however, it is impossible to send an offer of the battle-play in a state that the battle-play cannot be performed with one or more other game apparatuses 10 as in a case where the list screen 150 is not displayed.

Furthermore, if the offer of the battle-play is sent (the battle-play is requested), a beacon signal for requesting the battle-play (a battle-play requesting beacon signal) is sent from the local communication module 30 of the game apparatus 10. This battle-play requesting beacon signal (second beacon signal) includes information such as a beacon ID, a device ID, a game ID, a player ID, an offer designation ID, etc.

The beacon ID, the device ID, the game ID and the player ID are as described above. The offer designation ID is identification information (player ID) of an opponent player to whom the offer (request) of the battle-play is sent. In a case where the offering screen 200 of FIG. 4(B) is displayed on the second LCD 46, the player ID of the player corresponding to the icon 170a is included in the second beacon signal as the offer designation ID. A reason why the offer designation ID is thus included in the beacon signal is that it is to be determined at a side that receives the second beacon signal whether the battle-play is offered because the beacon signal is broadcasted.

On the other hand, in a case where an offer of the battle-play is sent (the battle-play is requested), a screen (an offered screen) 250 shown in FIG. 5(B) for a case where the battle-play is requested is displayed. At this time, as shown in FIG. 5(A), the game screen 100 of the single-play is still displayed on the first LCD 44, and the single-play is continued according to an operation by the player. As seen through a comparison of FIG. 3(A) and FIG. 5(A) with each other, for example, even when the offer of the battle-play is received, the player character 102 and the monster character 104 are moved in the game world according to an operation by the player while the offer is not responded to, that is, a response is being reserved. That is, even if an offer of the battle-play is received, the game is not suspended and a battle-play is not started as an interruption.

As shown in FIG. 5(B), in the offered screen 250, a displaying region 252 is formed in an upper portion thereof, and an icon 254 is displayed below the displaying region 252. Furthermore, below the icon 254, an icon 256 and an icon 258 are displayed.

In the displaying region 252, information (text information) indicating the offer of the battle-play is received from what player is displayed. The icon 254 is an icon that is applied with a face image of a game avatar that is used by a player who sends an offer of the battle-play. As seen from FIG. 3(B), the battle-play is offered by an acquaintance player corresponding to the icon 172a that is displayed on the list screen 150. By selecting (touching) the icon 254, it is possible to see the profile information of the corresponding player. The icon 256 is a button for accepting the offer of the battle-play. The icon 258 is a button for refusing the offer of the battle-play.

In a case where the offered screen 250 is displayed, if and when the icon 256 is turned-on (touched), a beacon signal (an offer accepting beacon signal) indicating that the offer of the battle-play is accepted is sent from the game apparatus 10.

The offer accepting beacon signal (third beacon signal) includes information of a beacon ID, a device ID, a game ID, a player ID, an offer source ID, etc.

The beacon ID, the device ID, the game ID and the player ID are as described above, and the offer source ID is identification information (player ID) of an opponent player who sends an offer of the battle-play (requests the battle-play). A reason why the offer source ID is included in the beacon signal is that it is necessary to determine that the offer of the battle-play is accepted at a side that receives the beacon signal because the beacon signal is broadcasted.

In a case where the offered screen 250 is displayed, when the icon 258 is turned-on (touched), the game apparatus 10 sends a beacon signal (offer refusing beacon signal) for refusing the offer of the battle-play.

The offer refusing beacon signal (fourth beacon signal) is the same as the third beacon signal except that a kind indicated by the beacon ID differs.

In addition, in this embodiment, in a case where there is no response within a predetermined time period (30-60 seconds, in this embodiment) after the offered screen 250 is displayed, the fourth beacon signal is automatically sent even if the icon 258 is not turned-on (touched).

Thus, even if an offer of the battle-play is received, the battle-play is not automatically started as an interruption, and it is possible to continue the game of the single-play by reserving a response (acceptance or refusal) to the offer. Then, if the game of the single-play is continued without sending a response, the offer of the battle-play can be automatically refused. That is, the player is not troubled.

In this embodiment, although the predetermined time period is counted from a time point that the offered screen 250 becomes to be displayed, not limited to this. The predetermined time period may be counted from a time point that the second beacon signal is received.

Furthermore, the predetermined time period may be counted by the game apparatus 10 at a side that sends the second beacon signal, and in a case where no response is sent within the predetermined time period from the game apparatus 10 that is at a receiving side, the game apparatus 10 that is at the sending side may automatically cancel the offer of the battle-play.

As described above, it is possible to send an offer of the battle-play to the players of one or more other game apparatuses 10, or accept or refuse an offer of the battle-play from the player of one or more other game apparatuses 10 in accordance with an operation by the player.

In a case where the offer of the battle-play is accepted, in order to start the battle-play, the game apparatus 10 of the player who sends an offer of the battle-play and the game apparatus 10 of the player who accepts the offer respectively suspend the game processing of the single-play mode, and a connection between these game apparatuses 10 is established to send/receive the data by using the local communication module 30. If the connection is established, the game processing of the battle-play mode can be performed. At this time, the game apparatus 10 at a side that offers the battle-play functions as a parent machine and the game apparatus 10 at a side that the battle-play is offered functions as a child machine, for example. The parent machine receives operation data of the child machine and performs game control processing of the battle-play mode based on the operation data of the child machine that is received and operation data of the own apparatus, and produces a game image according to a processing result and outputs the game image (for screen displaying and so on), and further sends data of the processing results to the child machine. The child machine produces and outputs a game image according to the data of the processing result that is received.

In addition, if the connection is established, since the game processing of a communication-play (battle-play) mode is started, the offer of the battle-play can be referred to as a request for connection (communication connection).

In the battle-play mode, the monster character that is used by the player who offers the battle-play and the monster character that is used by the player who accepts the offer are arranged in the game world, and in accordance with operations of the respective players, attacks another monster character mutually or defend an attack by another monster character.

If the battle-play is settled and thus the game processing of the battle-play mode is ended, the game processing of the single-play mode that is suspended is re-started, for example. When the game processing of the single-play mode is suspended, the game data that is used for the game processing of the single-play mode (single-play processing data 5040 is saved, and read out at the re-start. Therefore, it is possible to re-start the game processing of the single-play mode from a time point that the same is suspended.

Figure 6:
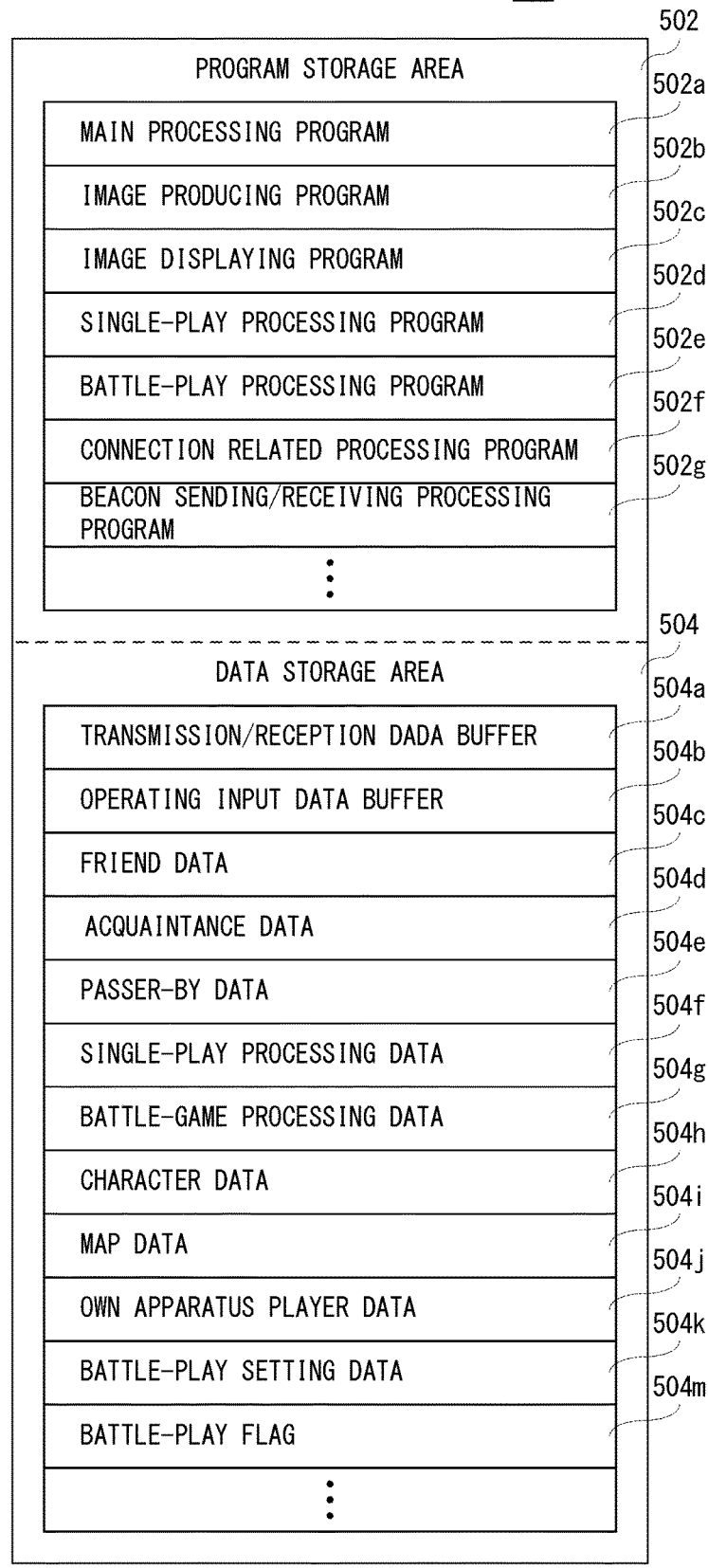
FIG. 6 is a view showing a non-limiting example memory map of a main memory shown in FIG. 2.

FIG. 6 is a view showing one example of a memory map 500 of the main memory 22 of the game apparatus 10 shown in FIG. 2. As shown in FIG. 6, the main memory 22 includes a program storage area 502 and a data storage area 504. The program storage area 502 is stored with a game program that is an application program being an example of an information processing program. The game program is constructed by a main processing program 502a, an image producing program 502b, an image displaying program 502c, a single-play processing program 502d, a battle-play processing program 502e, a connection related processing program 502f, a beacon sending/receiving processing program 502g, etc.

The main processing program 502a is a program for a main routine (entire game processing) of the game of this embodiment. The image producing program 502b is a program for producing image data for various kinds of screens (100, 150, 200, 250, etc.) by using data such as polygon data and texture data. The image displaying program 502c is a program for outputting the image data that is produced according to the image producing program 502b to the first LCD 44 and the second LCD 46.

The single-play processing program 502d is a program for the game processing of the single-play mode. The battle-play processing program 502e is a program for the game processing of the battle-play mode. The connection related processing program 502f is a program that sends an offer of the battle-play to one or more other game apparatuses 10, or receives the offer of the battle-play from one or more other game apparatuses 10, and responds to (accepts or refuses) the offer of the battle-play from one or more other game apparatuses 10, during a time that the game processing of the single-play mode is being performed. The beacon sending/receiving processing program 502g is a program for sending/receiving a beacon signal.

In addition, the program storage area 502 is also stored with a sound outputting program, a back-up program, etc. The sound outputting program is a program for producing and outputting a game sound (music). The back-up program is a program for saving the game data in accordance with an instruction by the player or a predetermined event.

The data storage area 504 is provided with a transmission/reception data buffer 504a and an operating input data buffer 504b.

The transmission/reception data buffer 504a is an area for temporarily storing data that is sent/received to or from one or more other game apparatuses 10 (in this embodiment, mainly, a beacon signal and data of the battle-play).

The operating input data buffer 504b is an area for temporarily storing operation data and touch position data from the input device 32.

The data storage area 504 is further stored with friend data 504c, acquaintance data 504d, passer-by data 504e, single-play processing data 504f, battle-play processing data 504g, character data 504h, map data 504i, own apparatus player data 504j, battle-play setting data 504k, etc.

The friend data 504c is player data of a player who is registered as a friend player. The player data includes, as shown in FIG. 7, information such as a player ID, a name of player, profile information, avatar information, a game situation, etc. These are player information that is included in the first beacon signal. Since the player data is stored for each player, in a case where a plurality of players are registered (stored), the player data is stored corresponding to each of the players. This is true for the acquaintance data 504d and the passer-by data 504e.

The acquaintance data 504d is player data of a player who is determined as an acquaintance player. The passer-by data 504e is player data of a player who is not registered as a friend player and is not determined as an acquaintance player, and a player of the game apparatus 10 that is a transmission source of the first beacon signal that is received by the game apparatus 10.

As described above, the player data of the friend player and the acquaintance player are stored in the data saving memory 26, and therefore, the friend data 504c and the acquaintance data 504d are read-in (loaded) to the data storage area 504 from the data saving memory 26 at a time of game start.

The single-play processing data 504f is data that is utilized for the game processing of the single-play mode. As shown in FIG. 8, the single-play processing data 504f includes current position data, level data, possessing item data, possessing character data, etc. The current position data is data (coordinates data) of a current position of the player character in the virtual space. The level data is data indicative of levels of the player character and the monster character that is possessed by the player character. The possessing item data is information (data) for identifying an item that is possessed by the player character. The possessing character data is information (data) for identifying a monster character that is possessed by the player character.

Returning to FIG. 6, the battle-play processing data 504g is data that is utilized for the game processing of the battle-play mode. As shown in FIG. 9, the battle-play processing data 504g includes reception data and battle opponent data. The reception data is data that is received from the game apparatus 10 of the battle opponent. In a case where the game apparatus 10 functions as a parent machine, the reception data is operating input data that is received from the game apparatus 10 of the battle opponent, functioning as a child machine. In contrast, in a case where the game apparatus 10 functions as a child machine, the reception data is the processing result data that is received from the game apparatus 10 of the battle opponent, functioning as a parent machine. The processing result data is data of a result that the game processing of the battle-play mode is performed based on the operating input data of the parent machine and/or the operating input data from the child machine. The child machine renews the game parameter and the game screen based on the processing result data.

Returning to FIG. 6, the character data 504h is data of various kinds of characters (player character, monster character, etc.) used in the game of this embodiment. The map data 504i is data for constructing a game world according to this embodiment in a virtual space.

The own apparatus player data 504j is player data that is registered for a player (owner) who owns the game apparatus 10. A content of the own apparatus player data 504j is the same as the player data shown in FIG. 7.

The battle-play setting data 504k is data as for battle-play setting information for setting a range of a target, i.e. a battle opponent of the battle-play, being set in the game apparatus 10. Specifically, the battle-play setting data 504k is data for determining which player out of a friend player, an acquaintance player and a passer-by player is a target of the battle-play. In this embodiment, the battle-play setting data 504k is constructed by a 3-bit register, and an uppermost bit corresponds to a friend player, a lowermost bit corresponds to a passer-by player, and a middle bit corresponds to an acquaintance player. In a case where the player is set as a target of the battle-play, "1" is set in the corresponding bit and in a case where the player is not set as a target of the battle-play, "0" is set in the corresponding bit.

In addition, as to whether the player is to be set as a target of the battle-play, a menu screen is displayed on the second LCD 46, for example, by operating the game apparatus 10, and it is possible to individually select on the menu screen.

The data storage area 504 is further provided with a battle-play flag 504m that is a flag for determining whether the battle-play is being currently performed. The battle-play flag 504m is constituted by a 1-bit register, for example, and in a case where the battle-play is being performed, "1" is set in the register, and in a case where the battle-play is not being performed, "0" is set in the register. The battle-play flag 504m is turned-on at a time that the battle-play is started and turned-off at a time that the battle-play is ended.

Figure 10:
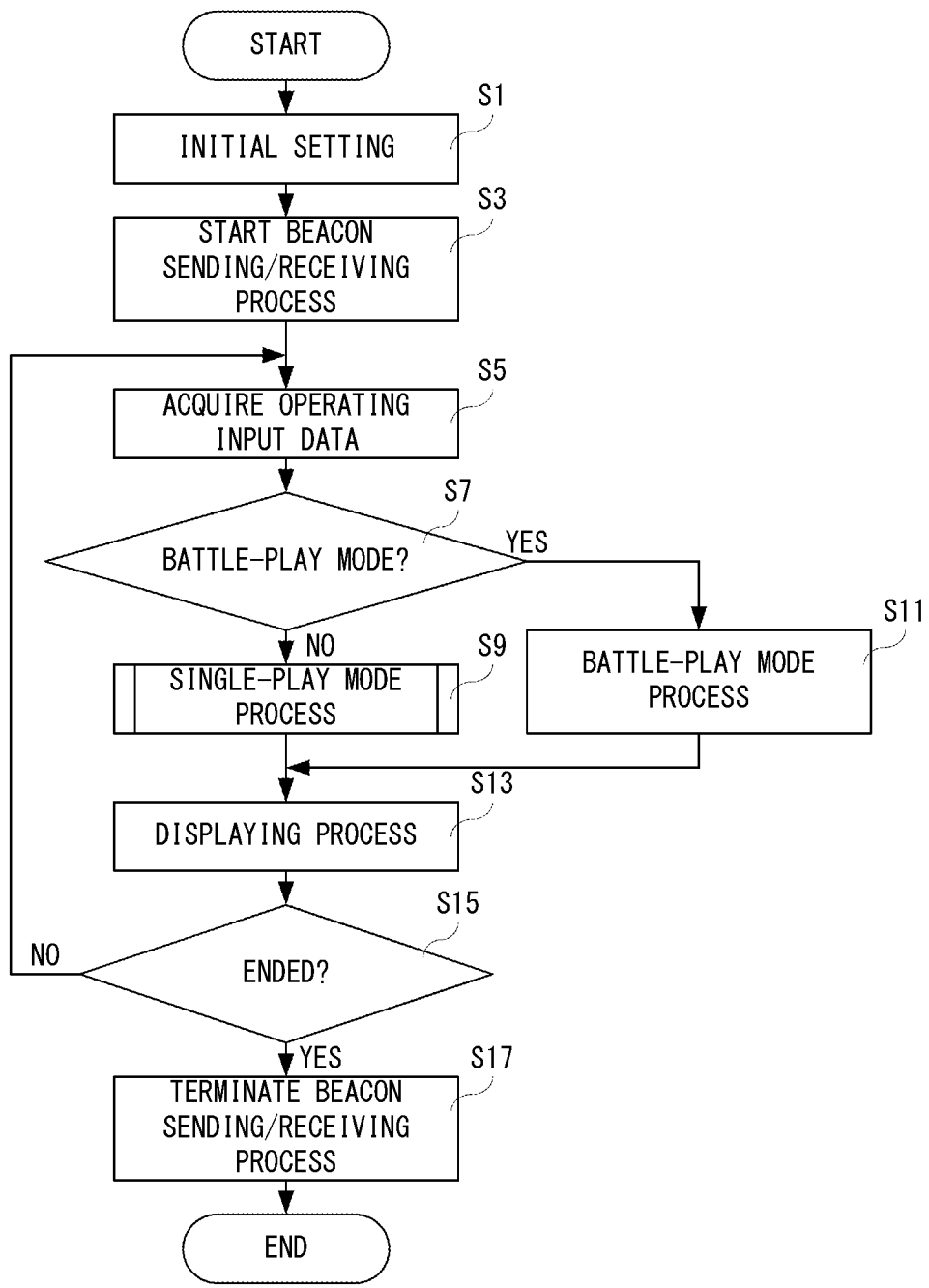
FIG. 10 is a flowchart showing a non-limiting example entire game process of a CPU shown in FIG. 2.

FIG. 10 is a flowchart showing an entire game process of the CPU 20 shown in FIG. 2. In addition, the processing in the respective steps of the flowcharts shown in FIG. 10 (the same is true for FIG. 11 to FIG. 15, described later) are only examples and therefore, as far as the same or similar results can be obtained, a processing order or sequence of the respective steps may be exchanged. Furthermore, this embodiment will be described on an assumption that the processing of the respective steps in the flowchart shown in FIG. 10 to FIG. 15 are performed by the CPU 20; however, a part of the steps may be performed by a processor(s) or a dedicated circuit(s) other than the CPU 20.

As shown in FIG. 10, when the entire game process is started, the CPU 20 performs an initial setting in a step S1 wherein a game world is constructed, a character such as a player character is positioned at an initial position or a position that is saved, and so on. In a next step S3, a beacon sending/receiving process (see FIG. 14 and FIG. 15) described later is started. That is, the beacon sending/receiving process is performed in parallel with the entire game process.

In a next step S5, operating input data is acquired. Here, the CPU 20 acquires operation data and/or touch position data stored in the operating input data buffer 504b. In a next step S7, it is determined whether the battle-play is being currently performed. Here, the CPU 20 determines whether the battle-play flag 504m is turned-on.

If "NO" is determined in the step S7, that is, when the single-play is currently performed, a single-play process (see FIG. 11 to FIG. 13) described later is performed in a step S9, and then, the process proceeds to a step S13. In contrast, if "YES" is determined in the step S7, that is, when the battle-play is currently performed, a game process of the battle-play mode as described above is performed, and then, the process proceeds to the step S13. In the step S13, a displaying process is performed. In this embodiment, the CPU 20 outputs image data to the first LCD 44 and the second LCD 46, respectively. Although not shown, a game sound is also output at this time.

Subsequently, in a step S15, it is determined whether the game is to be ended. Here, the CPU 20 determines whether an end of the game is instructed by the player. If "NO" is determined in the step S15, that is, if the game is not to be ended, the process returns to the step S5. In contrast, if "YES" is determined in the step S15, that is, when the game is to be ended, in a step S17, the beacon sending/receiving process is terminated, and then, the entire game process is terminated.

In addition, a scan time of the steps S5-S15 is executed by one (1) frame, and one frame is a time interval for renewing a screen (1/30 seconds or 1/60 seconds), for example.

Figure 11:
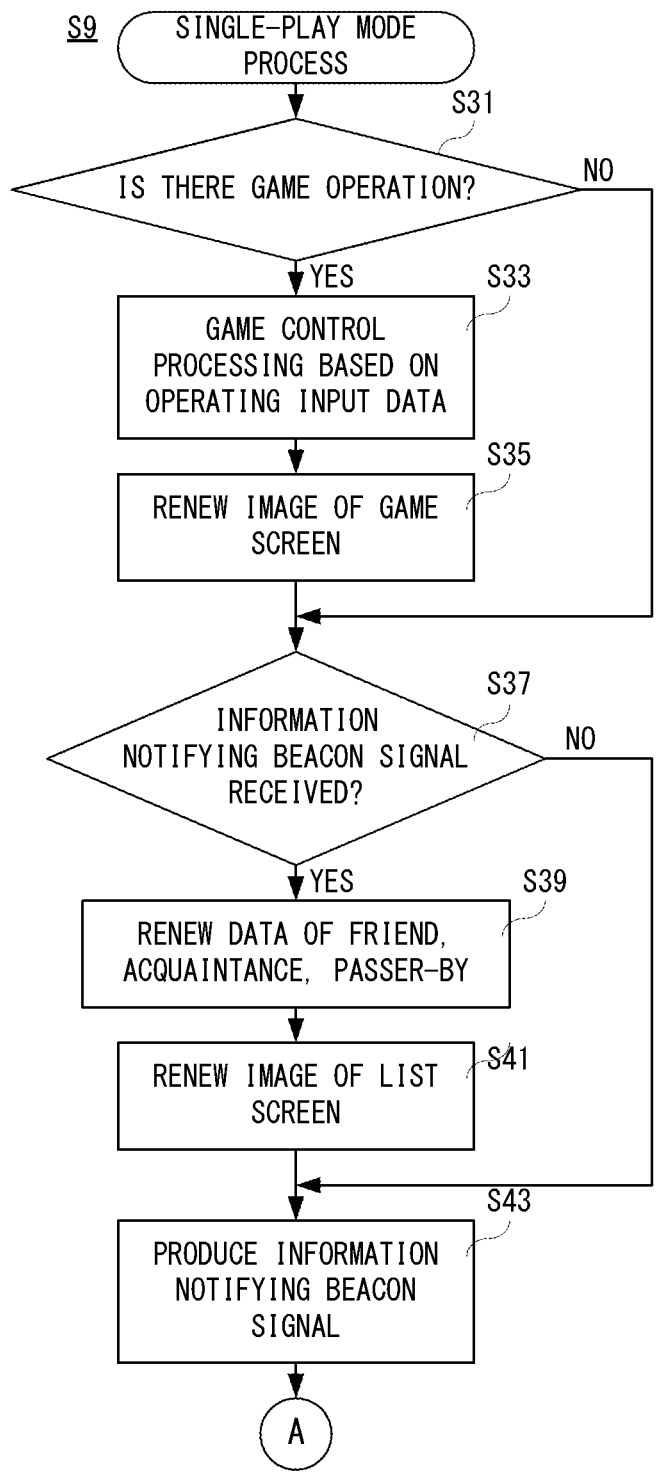
FIG. 11 is a flowchart showing a non-limiting example part of a single-play process by the CPU shown in FIG. 2.
Figure 12:
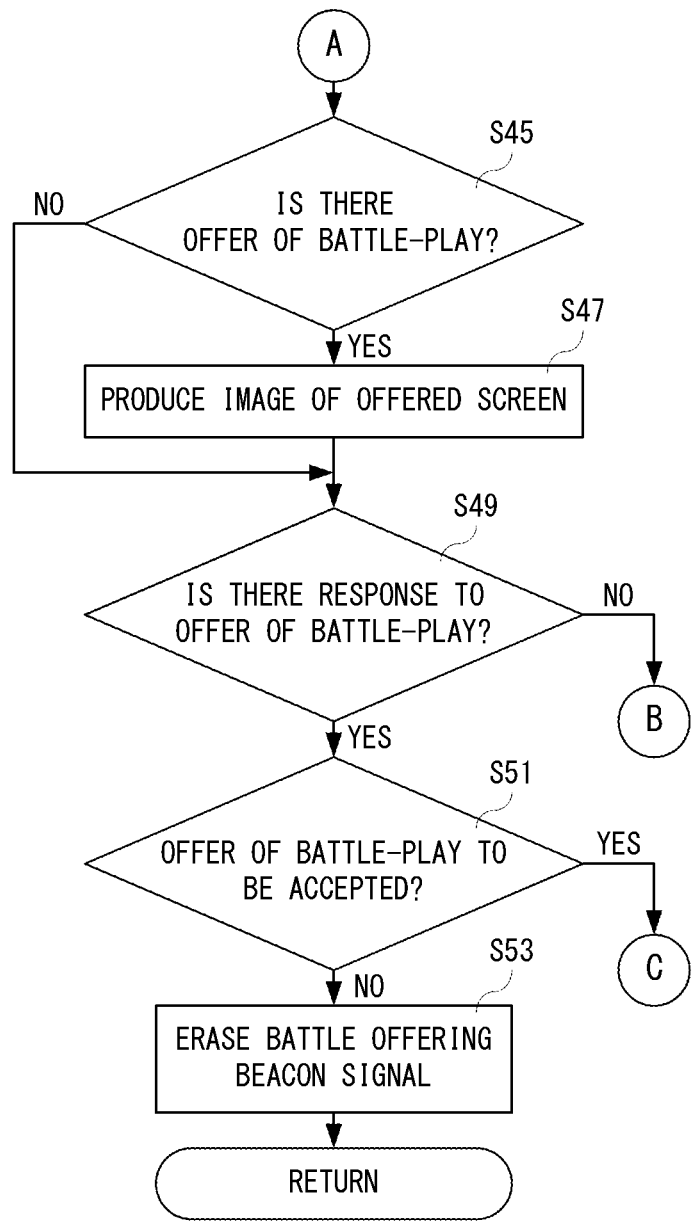
FIG. 12 is a flowchart showing a non-limiting example further part of the single-play process by the CPU shown in FIG. 2, following FIG. 11.
Figure 13:
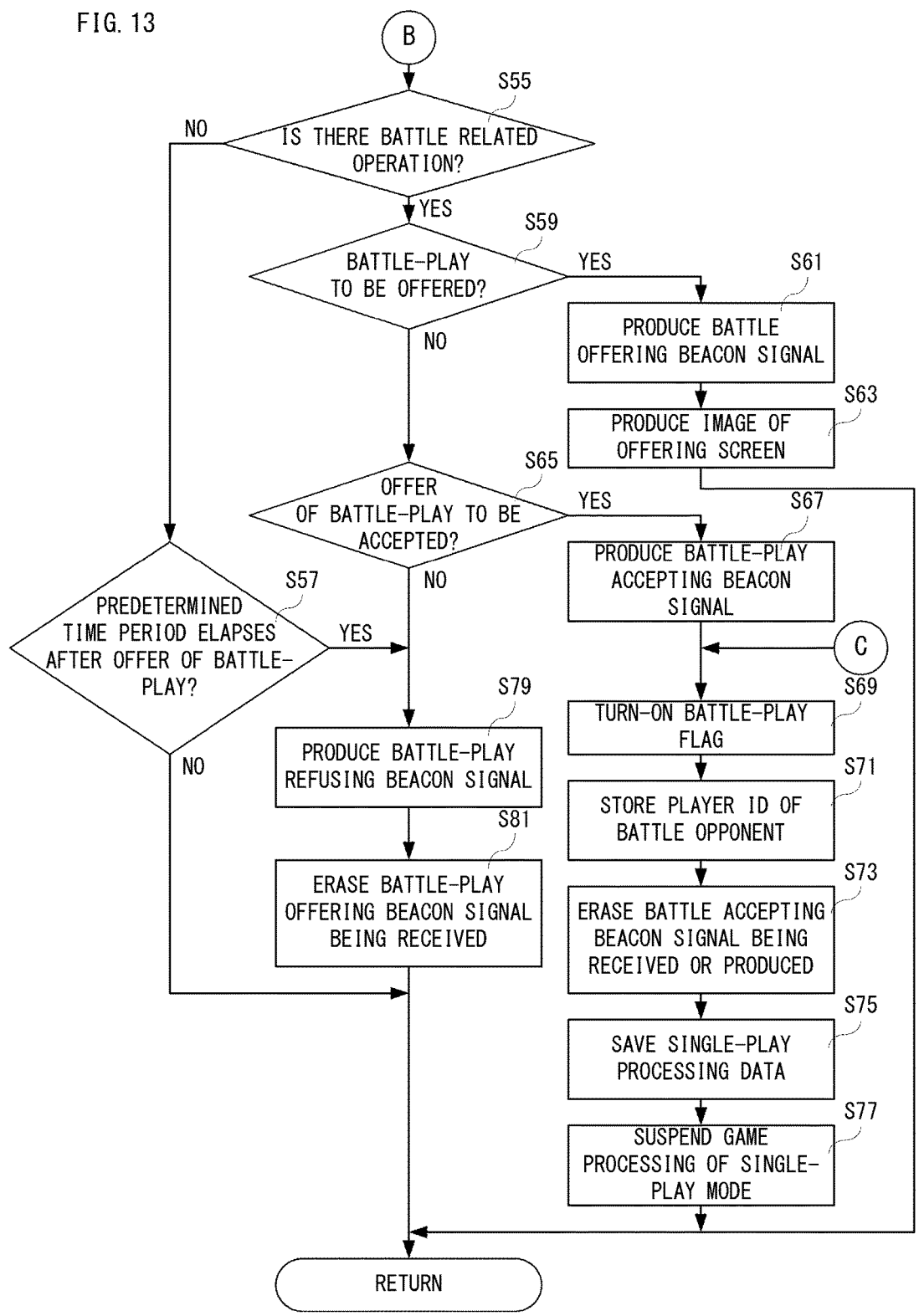
FIG. 13 is a flowchart showing a non-limiting example still further part of the single-play process by the CPU shown in FIG. 2, following FIG. 12.

FIG. 11-FIG. 13 shows a flowchart of the single-play process shown in the step S9 in FIG. 10. As shown in FIG. 11, when the single-play process is started, the CPU 20 determines whether there is an operation for game in a step S31. That is, the CPU 20 determines whether operation data and/or touch position data for the single-play game is stored in the operating input data buffer 504b.

If "NO" is determined in the step S31, that is, if no operation for game exists, the process proceeds to a step S37 with no operation. In contrast, if "YES" is determined in the step S31, that is, when the operation for game exists, in a step S33, the game control processing (the game processing of the single-play mode) is performed based on the operating input data. The game processing of the single-play mode is as described above.

In a next step S35, the image data of the game screen 100 as shown in FIG. 3(A), FIG. 4(A) and FIG. 5(A) is renewed. Here, image data reflecting a result of the game control processing in the step S33 is produced. Subsequently, in the step S37, it is determined whether an information notifying beacon signal is received. Here, the CPU 20 determines whether a first beacon signal from one or more other game apparatuses 10 is stored in the transmission/reception data buffer 504a.

If "NO" is determined in the step S37, that is, if the information notifying beacon signal is not received, the process proceeds to a step S43 with no operation. In contrast, if "YES" is determined in the step S37, that is, if the and when information notifying beacon signal is received, in a step S39, the friend data 504c, the acquaintance data 504d and the passer-by data 504e are renewed. Furthermore, when a plurality of information notifying beacon signals are received, in accordance with each of the information notifying beacon signals, the friend data 504c, the acquaintance data 504d and the passer-by data 504e are renewed. It should be noted that only data according to the information notifying beacon signal that is received is renewed. Then, in a step S41, image data of the list screen 150 as shown in FIG. 3(B) is renewed (produced), and then, the process proceeds to the step S43. A renewal (production) of the image data of the list screen 150 in the step S41 is as described above.

In the step S43, an information notifying beacon signal (first beacon signal) is produced. Here, the CPU 20 produces the first beacon signal with referring to the own apparatus player data 504*j* and the battle-play setting data 504*k*. Here, as the game situation, the single-play mode is written. Furthermore, the first beacon signal that is produced in the step S43 is stored in the transmission/reception data buffer 504*a*. This is true for a case where other beacon signals are produced.

As shown in FIG. 12, in a succeeding step S45, it is determined whether an offer of the battle-play is received. That is, the CPU 20 determines whether a second beacon signal that is sent from one or more other game apparatuses 10 and the own apparatus player ID is included as an offer designation ID is received.

If "NO" is determined in the step S45, that is, if no offer of the battle-play exists, the process proceeds to a step S49 with no operation. In contrast, if "YES" is determined in the step S45, that is, when there is the offer of the battle-play, in a step S47, image data for displaying the offered screen 250 as shown in FIG. 5(B) is produced, and then, the process proceeds to the step S49.

In the step S49, it is determined whether a response to the offer of the battle-play exists. Specifically, the CPU 20 determines whether a third beacon signal or a fourth beacon signal from the game apparatus 10 that is owned by the player represented by the offer designation ID of the second beacon signal that is previously sent is received.

If "NO" is determined in the step S49, that is, if no response to the offer of the battle-play is received, the process proceeds to a step S55 shown in FIG. 13. In contrast, if "YES" is determined in the step S49, that is, when a response to the offer of the battle-play is received, in a step S51, it is determined whether the offer of the battle-play is accepted. That is, the CPU 20 determines whether the beacon signal that is received is the third beacon signal.

If "YES" is determined in the step S51, that is, when the offer of the battle-play is accepted, the process proceeds to a step S69 shown in FIG. 13. In contrast, if "NO" is determined in the step S51, that is, when the beacon signal that is received is the fourth beacon signal, it is determined that the offer of the battle-play is refused, and accordingly, the battle-play offering beacon signal (second beacon signal) that is produced by own the game apparatus 10 is erased from the transmission/reception data buffer 504*a* in a step S53, and then, the process returns to the entire game process.

As shown in FIG. 13, in the step S55, it is determined whether an operation associated with the battle-play exists. Here, the CPU 20 determines, with referring to the operating input data buffer 504*b*, whether an operation for sending an offer of the battle-play or for responding to (accepting or refusing) the offer of the battle-play is performed.

If "NO" is determined in the step S55, that is, if there is no operation associated with the battle-play, in a step S57, it is determined whether a predetermined time period (30 seconds to 60 seconds, for example) elapses from a time that the offer of the battle-play is received. For example, the CPU 20 starts a timer not shown at a time that "YES" is determined in the step S45, and determined whether a count value thereof becomes equal to or more than the predetermined time period while the offer of the battle-play is not responded.

If "NO" is determined in the step S57, that is, if the predetermined time period does not elapse after receiving the offer of the battle-play, the process returns to the entire game process. In addition, in the step S57, "NO" is also determined in a case where there is no offer of the battle-play. On the other hand, if "YES" is determined in the step S57, that is, when the predetermined time period elapses after receiving the offer of the battle-play, the process proceeds to a step S79.

If "YES" is determined in the step S55, that is, when there is an operation for the battle-play, in a step S59, it is determined whether an offer of the battle-play is to be sent to one or more other game apparatuses 10 (players). If "YES" is determined in the step S59, that is, when an offer of the battle-play is to be sent to one or more other game apparatuses 10, a battle-play offering beacon signal (second beacon signal) is produced in a step S61, and image data for displaying the offering screen 200 as shown in FIG. 4(B) is produced in a step S63, and then, the process returns to the entire game process.

In contrast, if "NO" is determined in the step S59, that is, if an offer of the battle-play is not to be sent to one or more other game apparatuses 10, in a step S65, it is determined whether an offer of the battle-play from one or more other game apparatuses 10 is to be accepted. Here, the CPU 20 determines whether the icon 256 is turned-on (touched) or the icon 258 is turned-on in the offered screen 250 shown in FIG. 5(B).

If "YES" is determined in the step S65, that is, in a case where the icon 256 is turned-on, it is determined that the offer of the battle-play is to be accepted, and then, in a step S67, a battle-play accepting beacon signal (third beacon signal) is produced, and thereafter, the process proceeds to the step S69. In the step S69, the battle-play flag 504*m* is turned-on, and in a step S71, the player ID of the battle opponent, i.e., the battle opponent data included in the battle-play processing data 504*g* is stored. Then, in a step S73, the battle accepting beacon signal that is received or produced (sent) is erased from the transmission/reception data buffer 504*a*. Furthermore, the single-play processing data 504*f* is saved in a step S75, and the game processing of the single-play mode is suspended in a step S77, and then, the process returns to the entire game process.

In addition, although not shown, the CPU 20 turns-on the battle-play flag 504*m* in the step S69, and suspends the game processing of the single-play mode in the step S77, and after the process returns to the entire game process, by using the local communication module 30, establishes a connection with the game apparatus 10 that is to be battled and performs the processing of the battle-play.

If "NO" is determined in the step S65, that is, in a case where the icon 258 is turned-on, it is determined that the offer of the battle-play is to be refused, a battle-play refusing beacon signal (fourth beacon signal) is produced in the step S79, and the battle-play offering beacon signal (second beacon signal) that is received is erased from the transmission/reception data buffer 504*a* in a step S81, and then, the process returns to the entire game process.

In addition, the fourth beacon signal that is produced in the step S79 is thereafter erased from the transmission/reception data buffer 504*a*.

Figure 14:
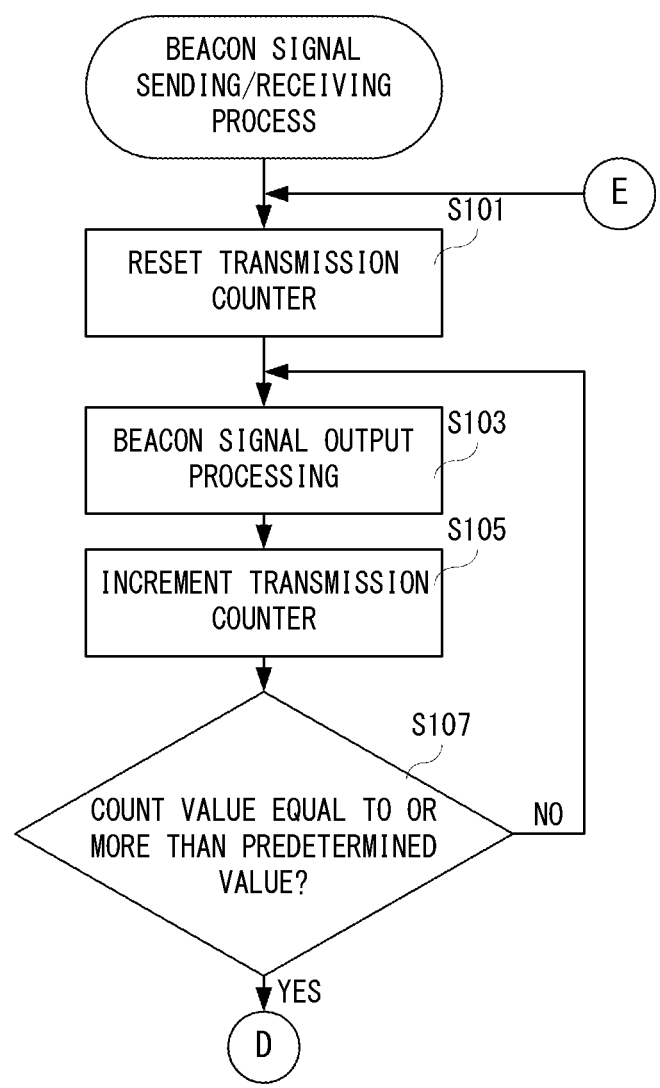
FIG. 14 is a flowchart showing a non-limiting example part of a beacon sending/receiving process by the CPU shown in FIG. 2.
Figure 15:
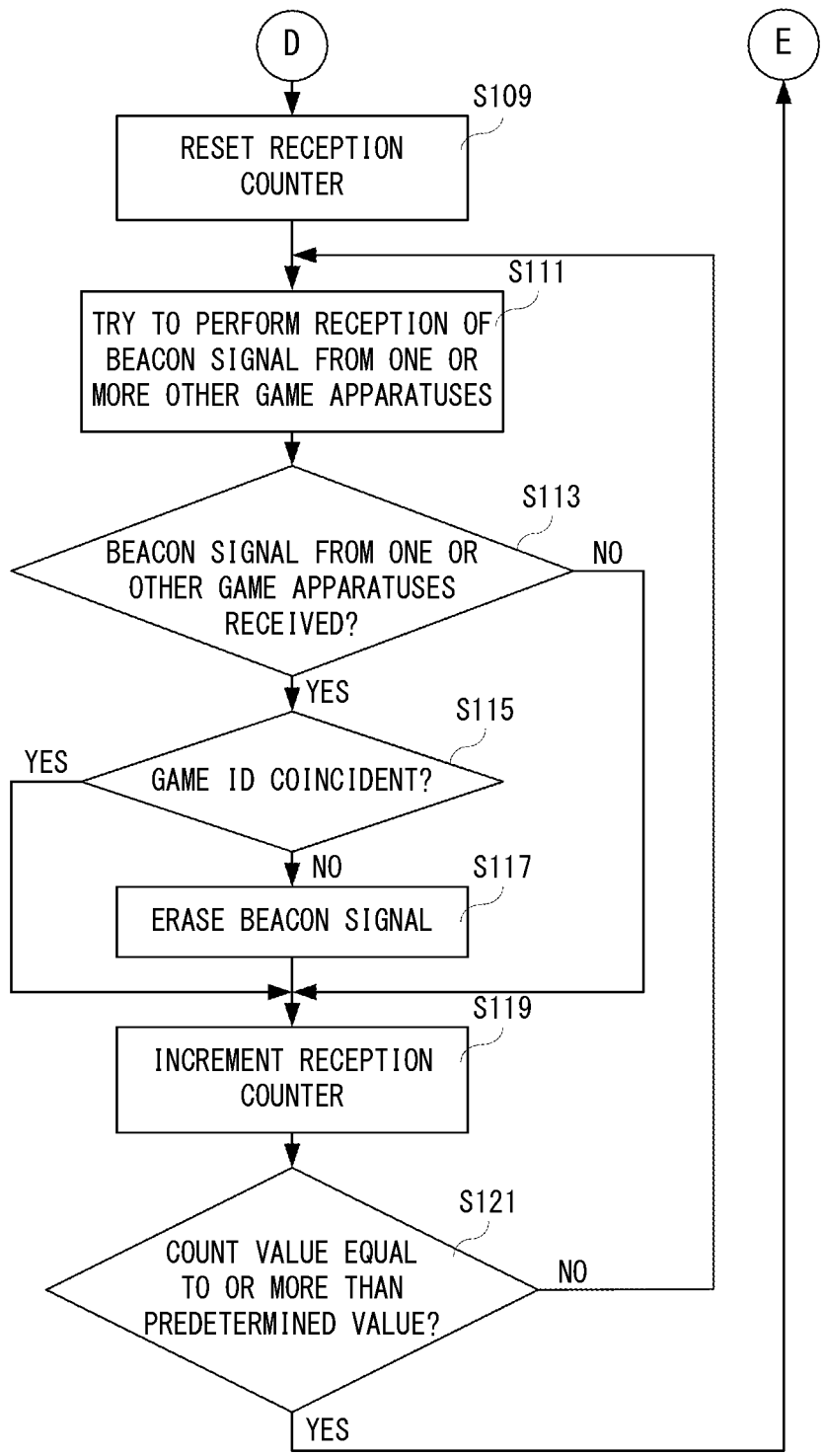
FIG. 15 is a flowchart showing a non-limiting example further part of the beacon sending/receiving process by the CPU shown in FIG. 2, following FIG. 14.

FIG. 14 and FIG. 15 shows a flowchart of a beacon sending/receiving process. As shown in FIG. 14, the CPU 20 resets a transmission counter in a step S101, when the beacon sending/receiving process is started. That is, a count value is set to "0". Although not shown, the transmission counter (as the same for "reception counter" described later) is provided in the data storage area 504 of the main memory 22.

In a succeeding step S103, beacon signal output processing is performed. Here, the beacon signal that is produced in the step S47, S77, S83 or S91 and registered in the transmission/reception data buffer 504*a* is sent (broadcasted). In a succeeding step S105, the transmission counter is incremented. That is, "1" is added to a count value of the transmission counter. Then, in a step S107, it is determined whether the count value of the transmission counter is equal to or more than a predetermined value. In addition, the predetermined value is a numeral value that is set in advance by the developer of the game or the like. This is true for a step S121.

If "NO" is determined in the step S107, that is, when the count value of the transmission counter is less than the predetermined value, the process returns to the step S103 with no operation. In contrast, if "YES" is determined in the step S107, that is, when the count value of the transmission counter is equal to or more than the predetermined value, a reception counter is reset in a step S109 shown in FIG. 15. That is, a count value of the reception counter is set to "0".

In a succeeding step S111, reception of a beacon signal from one or more other game apparatuses 10 is tried. When the beacon signal from one or more other game apparatuses 10 is received, the CPU 20 stores a received beacon signal to the transmission/reception data buffer 504a. In a next step S113, it is determined whether a beacon signal from one or more other game apparatuses 10 is received. Here, it is determined whether the beacon signal that is sent from one or more other game apparatuses 10 is stored in the transmission/reception data buffer 504a.

If "NO" is determined in the step S113, that is, if no beacon signal from one or more other game apparatuses 10 is received, the process proceeds to a step S119 with no operation. In contrast, if "YES" is determined in the step S113, that is, when the beacon signal from one or more other game apparatuses 10 is received, in a step S115, it is determined whether the game ID is identical. That is, the CPU 20 determines whether the game ID included in the beacon signal that is received is coincident with the game ID of the game that is being performed by own the game apparatus 10.

If "YES" is determined in the step S115, that is, when the game IDs are coincident with each other, the process proceeds to the step S119 with no operation. On the other hand, if "NO" is determined in the step S115, that is, if the game IDs are not coincident with each other, in a step S117, the beacon signal is erased from the transmission/reception data buffer 504a, and then, the process proceeds to the step S119.

In addition, in a case where a plurality of beacon signals are received in the step S111, the processing in the step S115 is performed for each of the received beacon signals, and according to a determination result, the processing in the step S117 is performed.

In the step S119, the reception counter is incremented. That is, "1" is added to a count value of the reception counter. Then, in a step S121, it is determined whether the count value of the reception counter is equal to or more than a predetermined value. If "NO" is determined in the step S121, that is, when the count value of the reception counter is less than the predetermined value, the process returns to the step S111. In contrast, if "YES" is determined in the step S121, that is, when the count value of the reception counter is equal to or more than the predetermined value, the process returns to the step S101 shown in FIG. 14.

Thus, by using the counters, the beacon signal is repeatedly sent or reception of the beacon signal is repeatedly tried. In addition, by using the counters, a case (mode) where the beacon signal is to be sent and a case (mode) where the beacon signal is to be received (tried to be received) are switched. Therefore, in a case where the first beacon signal is to be sent/received, a mode searching a candidate of the battle opponent and a mode to be searched for a candidate of the battle opponent (searched mode) are switched. Since such a beacon signal sending/receiving process is repeatedly performed during a time that the entire game process is performed, the game apparatus 10 repeatedly searches another game apparatus 10 that is a candidate of the battle opponent.

According to this embodiment, during a time that the game processing of the single-play mode, i.e. an application is being performed, the game screen, i.e. an application performing screen is displayed for the game and the list including a player who is able to perform the battle-play, i.e. a communication application is displayed, and at an arbitrary timing the battle-play is offered to a desired player, and accordingly, it is possible to offer the battle-play to the desired player while enjoying the game of the single-play mode. That is, since a connection establishment can be requested at an arbitrary timing, it is possible to increase convenience of a communication connection.

Furthermore, according to this embodiment, even in a case where the offer of the battle-play is received, the game of the single-play can be continuously performed with sending no response, and therefore, the game of the single-play is not suspended or it is not necessary to suspend the game of the single-play to respond to the offer of the battle-play, or the single-play is not automatically shifted to the battle-play as an interruption. That is, it is possible to respond to the offer of the battle-play at an arbitrary timing during the game of the single-play is being performed.

Furthermore, according to this embodiment, in a case where the offer of the battle-play is not responded, when the predetermined time period elapses, the battle-play refusing beacon signal is automatically sent, and accordingly, it is possible to save the player's trouble.

Furthermore, according to this embodiment, it is possible to know a current situation such as a game situation of a player who is registered as a friend, a player who is determined as an acquaintance or a passer-by player merely passing each other, and thus, to offer the battle-play to only a player who is able to perform the battle-play.

In addition, although one or more game apparatuses that exist within a range that the beacon signal can be sent or received (predetermined area) is detected to produce a list in this embodiment, not limited to this. For example, in a case where a wireless communication is performed by using the internet communication module via an access point and an internet, one or more other game apparatuses being connected to the internet may be detected to produce a list. Furthermore, by detecting the game apparatuses that exist within a range that the beacon signal can be sent or received and the game apparatuses being connected to the internet, a list may be produced.

Here, in a case where the list is produced and the battle-play is performed through a short-distance radio communication that uses the local communication module, it is possible to say that another player existing in a relatively nearer place is searched and the battle-play is performed with such another player.

In addition, even in a case where the internet communication module is used, it is possible to search a player who exists in a relatively nearer place (within a predetermined area) to perform the battle-play with such a player. In such a case, by calculating a current position or place of the game apparatus itself based on a radio intensity at a time that the data is received from a neighboring access point, and by sending and receiving the current place (position) that is calculated to or from another game apparatus through a wireless communication, it is possible to determine a game apparatus that exists within the predetermined area. Alternatively, it is possible to determine that another game apparatus that is accessing the same access point exists within the predetermined area. In such a case, it is possible to search a player who is present in the same prefecture, the same city or the same region or area as a player existing within the predetermined area or at a relatively nearer place, and display the player in the list. In addition, the searched actually is a game apparatus owned by a player.

Furthermore, although a case where the battle-play is performed by two game apparatuses is described in this embodiment, the battle-play can be performed with three or more game apparatuses. In such a case, the game apparatus sends an offer of the battle-play to a plurality of other game apparatuses during a time that the game processing of the single-play mode is being performed, and waits for responses from the plurality of other game apparatuses while continuously performing the game processing of the single-play mode. On the other hand, in a case where an offer of the battle-play is received from one or more other game apparatuses, the game processing of the battle-play mode is started (performed) after that all game apparatuses that receive the offers of the battle-play accepts the offers.

Furthermore, although only a case where the battle-play is performed as an example of a communication game is described, this embodiment can be similarly applied to a case where an exchange of a monster character and an item is performed with other game apparatus(es).

Furthermore, the structure of the game apparatus is not limited to that of the embodiment. For example, a display device (LCD) may be used by dividing a single LCD into two displaying areas. A touch panel may be provided on the first LCD, or on both of the first LCD and the second LCD. A touch panel may not be provided. Furthermore, the game apparatus may comprise a GPS function. In such a case, it is possible to detect one or more other game apparatuses at a short distance (within the predetermined area) based on an actual distance.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed units communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system, comprising:
   an application performing unit operable to perform an application according to an operation by a user;
   a first display controlling unit operable to display an application performing screen of the application that is performed by the application performing unit;
   a communicating unit operable to perform a communication with one or more information processing apparatuses;
   a searching unit operable to repeatedly search one or more information processing apparatuses existing within a predetermined area by using the communicating unit;
   a list producing unit operable to produce a list of one or more other users respectively corresponding to the one or more information processing apparatuses that are searched by the searching unit;
   a second display controlling unit operable to repeatedly display the list that is produced by the list producing unit; and
   an offer sending unit operable to send a connection request to the one or more information processing apparatuses, whose corresponding other users are displayed in the list and are selected by user input on the list, by using the communicating unit at an arbitrary timing during a time that the application is being performed.

2. An information processing system according to claim 1, wherein the predetermined area is an area that the communicating unit can perform a communication with the one or more information processing apparatuses by a short-distance wireless communication.

3. An information processing system according to claim 1, further comprising:
   an offer receiving unit operable of receive, using the communicating unit, a connection request from the offer sending unit of each of the one or more information processing apparatuses; and
   a notifying unit operable to notify the user of the connection request when the offer receiving unit receives the connection request, wherein
   the application performing unit is operable to continue the performance of the application according to the user's operation even in a case where the connection request is received by the offer receiving unit.

4. An information processing system is according to claim 3, wherein the application performing unit is operable to continue the performance of the application even in a state that the connection request is not responded to in a case where the connection request is received by the offer receiving unit.

5. An information processing system according to claim 3, further comprising an accepting unit operable to accept the connection request in accordance with an operation by the user; and a suspending unit operable to suspend the application when the accepting unit accepts the connection request.

6. An information processing system according to claim 3, further comprising a refusing unit operable to refuse the connection request when a predetermined time period elapses in a state that the connection request is not responded to after the notifying unit notifies the connection request.

7. An information processing system according to claim 5, further comprising a communication application performing unit operable to perform a communication application that is different from the application with the one or more information processing apparatuses when the connection request is accepted by the accepting unit.

8. An information processing system according to claim 7, wherein the application performing unit is operable to re-start the performance of the application that is suspended by the suspending unit when the performance of the communication application is terminated.

9. An information processing system according to claim 1, wherein the list includes information of the other users respectively corresponding to the information processing apparatus that becomes incapable of performing a communication, and the second display controlling unit is operable to display the information of an information processing apparatus capable of performing a communication and the information of an information processing apparatus incapable of performing a communication in different manners.

10. An information processing system according to claim 1, wherein the list further includes information of a user of an information processing apparatus of a first category, that is allowed to perform a communication with each other or in a one-way manner, and the second display controlling unit displays, in a discriminable manner, the information of the user of the information processing apparatus of the first category, and the information of the information processing apparatus of a second category not belonging to the first category out of the one or more information processing apparatuses that are searched by the searching unit.

11. An information processing system according to claim 10, wherein the second display controlling unit is operable to display the information of the information processing apparatus of the first category and the information of the information processing apparatus of the second category in a further discriminable manner on whether the information processing apparatus can perform a communication.

12. An information processing system according to claim 10, wherein the second display controlling unit is operable to display at least one of the information of the information processing apparatus of the first category and the information of the information processing apparatus of the second category in accordance with a first displaying condition that is set in advance.

13. An information processing system according to claim 1, wherein the communicating unit is operable to broadcast a predetermined signal including at least information of the own information processing system.

14. An information processing system according to claim 13, wherein the predetermined signal includes a second displaying condition that indicates it is possible for the information processing apparatus that receives the information of the own information processing system to display the information of the own information processing system.

15. An information processing system according to claim 14, wherein the one or more information processing apparatuses include an information processing apparatus of the first category that is allowed to perform a communication with each other or in a one-way manner and an information processing apparatus of the second category not belonging to the first category out of the one or more information processing apparatuses searched by the searching unit, and
the second displaying condition is a condition that designates at least one of the information processing apparatus of the first category and the information processing apparatus of the second category.

16. An information processing system according to claim 13, wherein the predetermined signal further includes identification information of the application, and the list producing unit is operable to produce the list by using a predetermined signal including the identification information of the application that is being performed by the application performing unit out of the predetermined signal from the information processing apparatus that is received by the communicating unit.

17. An information processing system according to claim 13, wherein the predetermined signal is a beacon signal.

18. An information processing system according to claim 1, wherein the searching unit is operable to search the one or more information processing apparatuses during a time that the application is being performed by the application performing unit.

19. An information processing apparatus, comprising:
a computer processor, the information processing apparatus being at least configured to:
perform an application according to an operation by a user;
display an application performing screen of the application that is performed;
perform a communication with another information processing apparatus;
repeatedly search one or more other information processing apparatuses in a short distance by using the performed communication;
produce a list of one or more other users respectively corresponding to the one or more other information processing apparatuses that are searched;
repeatedly display the list that is produced; and
send a connection request to the one or more other information processing apparatuses, whose corresponding other users are displayed in the list and are selected by user input on the list, by using the performed communicating at an arbitrary timing during a time that the application is being performed.

20. A non-transitory computer readable storage medium storing an information processing program that causes a computer of an information processing apparatus to provide functionality comprising:
an application performance to perform an application according to an operation by a user;
a first display control to display an application performing screen of the application that is performed by the application performance;
a communication including performance of a communication with another information processing apparatus;
a search to repeatedly search one or more other information processing apparatuses that exist within a predetermined area by using the communication;

a list production to produce a list of one or more other users respectively corresponding to the one or more other information processing apparatuses that are searched in the search;

a second display control to repeatedly display the list that is produced by the list production; and an offer sending to send a connection request to the one or more other information processing apparatuses, whose corresponding other users are displayed in the list and are selected by user input on the list, by using the communication at an arbitrary timing during a time that the application is being performed.

21. An information processing method in an information processing apparatus comprising a communicating unit operable to perform a communication with another information processing apparatus, wherein a computer of the information processing apparatus:

(a) performs an application in response to an operation by a user;

(b) displays an application performing screen of the application that is performed in the step (a);

(c) searches one or more other information processing apparatuses in a short distance by using the communicating unit repeatedly;

(d) produces a list of one or more other users respectively corresponding to the one or more other information processing apparatuses that are searched in the step (c);

(e) displays the list that is produced in the step (d) repeatedly; and (f) sends a connection request to the one or more other information processing apparatuses, whose corresponding other users are displayed in the list and are selected by user input on the list, by using the communicating unit at an arbitrary timing during a time that the application is being performed.

* * * * *